US010254679B2

(12) United States Patent
Yamamoto et al.

(10) Patent No.: US 10,254,679 B2
(45) Date of Patent: Apr. 9, 2019

(54) MEMORY CONTROL DEVICE, MEMORY DEVICE AND IMAGE FORMING APPARATUS

(71) Applicant: Oki Data Corporation, Tokyo (JP)

(72) Inventors: Kazuya Yamamoto, Tokyo (JP); Keisuke Iwahashi, Tokyo (JP); Keisuke Watanabe, Tokyo (JP); Takashi Kobayashi, Tokyo (JP); Keitaro Ishida, Tokyo (JP); Yasushi Yamawaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/628,296

(22) Filed: Jun. 20, 2017

(65) Prior Publication Data

US 2017/0371272 A1    Dec. 28, 2017

(30) Foreign Application Priority Data

Jun. 28, 2016 (JP) ................................ 2016-127604

(51) Int. Cl.
| | |
|---|---|
| *G06F 21/85* | (2013.01) |
| *G03G 15/08* | (2006.01) |
| *G06F 11/30* | (2006.01) |
| *G03G 15/00* | (2006.01) |
| *G03G 21/18* | (2006.01) |

(52) U.S. Cl.
CPC ..... *G03G 15/0863* (2013.01); *G03G 15/5091* (2013.01); *G03G 15/553* (2013.01); *G03G 21/1889* (2013.01); *G06F 11/3027* (2013.01); *G06F 21/85* (2013.01); *G03G 15/55* (2013.01); *G03G 2215/0697* (2013.01)

(58) Field of Classification Search
CPC ............................. G06F 11/3027; G06F 21/85
See application file for complete search history.

(56) References Cited

U.S. PATENT DOCUMENTS

| | | | |
|---|---|---|---|
| 6,539,476 B1 * | 3/2003 | Marianetti | G06F 1/266 710/10 |
| 2003/0115503 A1 * | 6/2003 | Lehman | G06F 1/08 714/25 |
| 2005/0182961 A1 * | 8/2005 | Timmermans | G06F 21/86 726/26 |
| 2008/0222407 A1 * | 9/2008 | Carpenter | G06F 21/575 713/2 |

(Continued)

FOREIGN PATENT DOCUMENTS

JP        2012-173697 A        9/2012

*Primary Examiner* — Edward J Dudek, Jr.
(74) *Attorney, Agent, or Firm* — Muncy, Geissler, Olds & Lowe, P.C.

(57) ABSTRACT

A memory control device includes a memory control part that controls memory through an interface part in accordance with a predetermined communication regulation, an illegal access detection part that detects an illegal access to the memory according to an access state from the memory control part to the memory and a signal state of the interface part, and a signal control part that switches the signal state of the interface part from a write-allowed state, in which the interface part is able to be written, to a write-inhibited state, in which the interface part is protected from being rewritten, when the illegal access is detected by the illegal access detection part.

19 Claims, 11 Drawing Sheets

(56) References Cited

U.S. PATENT DOCUMENTS

| | | | |
|---|---|---|---|
| 2013/0065635 A1* | 3/2013 | Nakayama | G06F 21/558 455/550.1 |
| 2013/0286421 A1* | 10/2013 | Yamada | H04N 1/00795 358/1.13 |
| 2015/0143037 A1* | 5/2015 | Smith | G06F 3/061 711/103 |

* cited by examiner

MEMORY CONTROL DEVICE, MEMORY DEVICE AND IMAGE FORMING APPARATUS

CROSS REFERENCE TO RELATED APPLICATIONS

This application claims priority under 35 USC 119 to Japanese Patent Application No. 2016-127604 filed on Jun. 28, 2016 original document, the entire contents which are incorporated herein by reference.

TECHNICAL FIELD

This invention relates to a memory control device, a memory device, and an image forming apparatus.

BACKGROUND

An image forming apparatus such as a printer, an MFP (Multi-Function Printer or Multi-Function Peripheral), or a facsimile machine can have nonvolatile memory such as EEPROM (Electrically Erasable Programmable Read-Only Memory) installed inside. In this nonvolatile memory, information such as setting information that is proprietary to the image forming apparatus and management information indicating consumable items etc. used by the image forming apparatus can be written. Based on this information, the image forming apparatus can manage the status of the apparatus. For example, the image forming apparatus can read information written in that nonvolatile memory at the time of starting up the apparatus, and can perform various kinds of processes according to the read information.

For example, Patent Document 1 discloses a detachable image forming unit that has a first memory part that stores lifetime information, usage amount information, and intended use information of parts, a second memory part that stores the lifetime information and the usage amount information read from the first memory part, and an image forming apparatus that rewrites the lifetime information stored in the first memory part based on the intended use information stored in the first memory part and the usage amount information stored in the second memory part. Here, the image forming unit can be made a consumable item, and both the first memory part and the second memory part can be made nonvolatile memory.

RELATED ART

[Patent Doc. 1] JP Laid-Open Application Publication 2012-173697

However, occurring in recent years is a problem that on a circuit board having nonvolatile memory built in, a wiring is added by a certain method to signal wires that control nonvolatile memory, and the nonvolatile memory is illegally accessed from the wiring, thereby information stored in the nonvolatile memory is illegally rewritten.

Especially, in an electronic apparatus such as an image forming apparatus having nonvolatile memory built in, if setting information indicating the setting of the apparatus or management information for imposing a usage restriction on the apparatus is stored in the nonvolatile memory, the electronic apparatus becomes unable to execute regular processes due to such illegal rewriting as mentioned above.

For example, in the image forming apparatus described in Patent Document 1, if information on consumable items is stored in nonvolatile memory for restricting the usage of other consumable items than the regular ones, if that information is illegally rewritten, consumable items other than the regular consumable items become usable. Then, in this image forming apparatus, by the use of irregular consumable items, the print quality could decline.

This invention was made considering such an actual situation as mentioned above, and its objective is to offer a memory control device, a memory device, and an image forming apparatus that can prevent illegal rewriting of information by an illegal access to memory through signal wires that control the memory.

SUMMARY

A memory control device disclosed in the application includes: a memory control part that controls memory through an interface part in accordance with a predetermined communication regulation, an illegal access detection part that detects an illegal access to the memory according to an access state from the memory control part to the memory and a signal state of the interface part, and a signal control part that switches the signal state of the interface part from a write-allowed state, in which the interface part is able to be written, to a write-inhibited state, in which the interface part is protected from being rewritten, when the illegal access is detected by the illegal access detection part.

A memory device disclosed in the application includes the above discussed memory control device, the memory, and the interface part.

An image forming apparatus disclosed in the application includes the above discussed memory device, and an image forming part that develops a latent image on a medium through an image forming process. Wherein the image forming part performs the image forming process according to information stored in the memory in the memory device.

This invention can prevent illegal rewriting of information stored in memory by an illegal access to the memory through signal wires that control the memory.

DETAILED EXPLANATION OF THE PREFERRED EMBODIMENT(S)

Explained below referring to FIGS. 1-16 are a memory control device, a memory device, and an image forming apparatus of each embodiment of this invention, as well as a memory control method in the memory control device and an image forming method in the image forming apparatus.

<<1>> Embodiment 1

Figure 1:
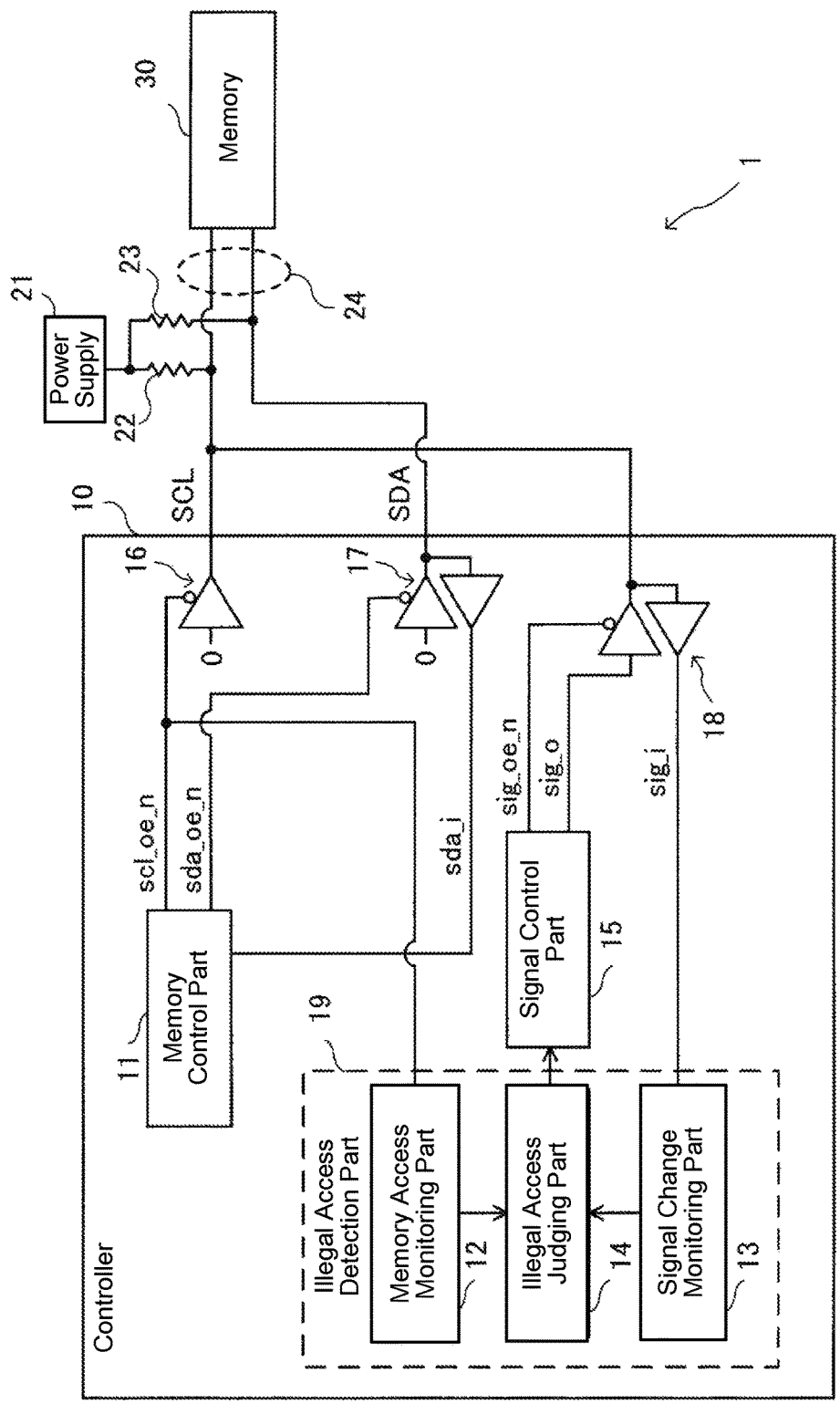
FIG. 1 is a schematic diagram showing a configuration example of a memory device of Embodiment 1 of this invention.

A memory control device and a memory device of Embodiment 1 are explained referring to FIGS. 1-12. FIG. 1 is a schematic diagram showing a configuration example of the memory device of Embodiment 1.

As shown in FIG. 1, the memory control device (called a controller) 10 of Embodiment 1 is connected to memory 30 through an interface part 24, and controls writing of information to the memory 30 and reading of information from the memory 30.

As the memory 30, nonvolatile memory such as EEPROM (Electrically Erasable Programmable Read-Only Memory) and ferroelectric memory (FeRAM: Ferroelectric Random Access Memory) can be adopted. In the memory 30, for example, information such as information on the status (status information) of an electronic apparatus having the memory 30 built in and information on the setting (setting information) of the electronic apparatus can be stored.

As shown in FIG. 1, the interface part 24 is a communication interface that can have multiple signal wires and performs communication between the controller 10 and the memory 30 in accordance with a predetermined communication regulation (or communication system). As this predetermined communication regulation, a communication regulation based on the I²C standard that is a synchronous serial communication regulation can be adopted. That is, as the interface part 24, the I²C bus that is a serial bus based on the I²C (Inter-Integrated Circuit) standard can be adopted.

The I²C bus is a serial bus developed by Philips Corporation, and as shown in FIG. 1, performs communication with two open-drain signal wires pulled up by pull-up resistors 22 and 23. In both of these two signal wires, bidirectional communication is performed. One of the two signal wires is a serial data signal wire (SDA wire) for a serial data signal (signal SDA), and the other is a serial clock signal wire (SCL wire) for a serial clock signal (signal SCL). Note that the interface part 24 also has an unshown ground (GND) wire installed. In Embodiment 1, explanations are basically given on the presumption that this predetermined communication regulation is a communication regulation based on the I²C standard.

The pull-up resistor 22 is a resistor connected between the SCL wire of the interface part 24 and a power supply 21 of the memory 30 for changing the signal SCL flowing in the open-drain SCL wire to a High (1) state. Also, the pull-up resistor 23 is a resistor connected between the SDA wire of the interface part 24 and the power supply 21 of the memory 30 for changing the signal SDA flowing in the open-drain SDA wire to the High (1) state.

In this manner, the controller 10 is connected to the memory 30 through the interface part 24 and controls the memory 30. Also, as shown in FIG. 1, the memory device 1 of Embodiment 1 is a device having these controller 10, interface part 24, and memory 30, and may have the controller 10, the pull-up resistors 22 and 23, the interface part 24, and the memory 30.

The memory device 1 can be incorporated in a variety of electronic apparatuses and controls the memory 30 obeying commands from an unshown CPU (Central Processing Unit) installed in the electronic apparatus. Both this CPU (or control part) and the controller 10 can be constructed on an FPGA (Field Programmable Gate Array), and also can be realized with a dedicated chip such as ASIC (Application Specific Integrated Circuit).

Next, the details of the controller 10 are explained. As shown in FIG. 1, the controller 10 can have a memory control part 11, a memory access monitoring part 12, a signal change monitoring part 13, an illegal access judging part (illegal access discerning part) 14, a signal control part 15, an output buffer 16, a bidirectional buffer 17, and a bidirectional buffer 18. Note that the controller 10 has an unshown power supply. Also, this power supply need not have the same voltage as that of the power supply 21 to which the pull-up resistors 22 and 23 are connected, and the pull-up resistors 22 and 23 only need to be compatible with the voltage of the power supply 21.

Obeying commands from the CPU installed in the electronic apparatus, the memory control part 11 controls the memory 30 through the interface part 24 according to the communication regulation based on the I²C standard. Specifically, following a clock generated internally, the memory control part 11 outputs an output enable signal scl_oe_n to the output buffer 16, and also outputs an output enable signal sda_oe_n corresponding to this command to the bidirectional buffer 17. By outputting such output enable signals, the memory control part 11 accesses the memory 30 and controls reading/writing of information through the interface part 24 that has the SCL wire to which the output terminal of the output buffer 16 is connected and the SDA wire to which the output terminal of the bidirectional buffer 17 is connected. The control of reading/writing of information indicates the control of writing information such as the status information and the setting information to the memory 30, or the control of reading the necessary information among the information stored in the memory 30 from the memory 30. Note that the signals of information read from the memory 30 are input to the bidirectional buffer 17 and output to the memory control part 11 through the signal wire of a signal sda_i.

The output buffer 16 has its output terminal connected to the memory 30 through the SCL wire of the interface part 24. The output buffer 16 is a buffer to control the signal SCL flowing in the SCL wire and changes the signal SCL to a Low (0) state or a Hi-z state by the output enable signal scl_oe_n, and its output terminal is made on open drain. That is, although the output buffer 16 has an open-drain output and can drive the signal SCL to the Low (0) state by the output enable signal scl_oe_n, the output enable signal scl_oe_n alone cannot drive the signal SCL to the High (1) state. However, because the pull-up resistor 22 is connected to the SCL wire to which the output terminal of the output buffer 16 is connected, if the signal SCL is set to the Hi-z state, the signal SCL can be set to the High (1) state by the pull-up resistor 22.

For example, by the memory control part 11 setting the output enable signal scl_oe_n to the High (1) state, the output buffer 16 can set the signal SCL to the Hi-z state, and the pull-up resistor 22 can set this signal SCL to the High (1) state. Also, by the memory control part 11 setting the output enable signal scl_oe_n to the Low (0) state, "0" is output from the output buffer 16, and the signal SCL can be set to the Low (0) state.

The bidirectional buffer 17 has its output terminal connected to the memory 30 through the SDA wire of the interface part 24. The bidirectional buffer 17 is a buffer to control the signal SDA flowing in the SDA wire, changes the signal SDA to the Low (0) state or the Hi-z state by the output enable signal sda_oe_n, and has an open-drain output. That is, although the bidirectional buffer 17 can drive the signal SDA to the Low (0) state by the output enable signal sda_oe_n, the output enable signal sda_oe_n alone cannot drive the signal SDA to the High (1) state. However, because the pull-up resistor 23 is connected to the SDA wire to which the output terminal of the bidirectional buffer 17 is connected, if the signal SDA is set to the Hi-z state, the signal SDA can be set to the High (1) state by the pull-up resistor 23.

For example, by the memory control part 11 setting the output enable signal sda_oe_n to the High (1) state, the bidirectional buffer 17 can set the signal SDA to the Hi-z state, and the pull-up resistor 23 can set this signal SDA to the High (1) state. Also, by the memory control part 11 setting the output enable signal sda_oe_n to the Low (0) state, "0" is output from the bidirectional buffer 17, and the signal SDA can be set to the Low (0) state.

Note that here on the presumption that the output elements of the output buffer 16 and the bidirectional buffer 17 are configured of a MOSFET (Metal-Oxide-Semiconductor Field-Effect Transistor), the output system is called the open drain. However, the output elements of the output buffer 16 and the bidirectional buffer 17 can also be configured of a bipolar transistor having its collector as the output terminal for example. In that case, the same output system is called an open collector.

Also, as shown in FIG. 1, the controller 10 has an illegal access detection part 19. The illegal access detection part 19 detects an illegal access to the memory 30 according to the access state from the memory control part 11 to the memory 30 and the signal state of the interface part 24. The illegal access detection part 19 can have the memory access monitoring part 12, the signal change monitoring part 13, and the illegal access judging part 14 mentioned above.

The memory access monitoring part 12 monitors the access state from the memory control part 11 to the memory 30. For example, as shown in FIG. 1, the memory access monitoring part 12 is connected to a signal wire that outputs the output enable signal scl_oe_n, monitors changes in the output enable signal scl_oe_n output from the memory control part 11, and if there is a change in the signal scl_oe_n, notifies the illegal access judging part 14 of the state (signal state) of the output enable signal scl_oe_n. The state of the output enable signal scl_oe_n indicates the access state from the memory control part 11 to the memory 30, and in this example, if the output enable signal scl_oe_n is in the High (1) state, there assumed to be no access from the memory control part 11 to the memory 30.

The signal change monitoring part 13 monitors changes in the signal state of the interface part 24. For example, as shown in FIG. 1, by monitoring the state of a signal sig_i output from the bidirectional buffer 18 connected to the SCL wire (the signal wire connected to the output terminal of the output buffer 16), the signal change monitoring part 13 monitors the state of the signal SCL flowing in the SCL wire. Upon detecting that the signal sig_i has changed from the High (1) state to the Low (0) state (that is, the signal SCL has changed from the High (1) state to the Low (0) state) for example, the signal change monitoring part 13 notifies the illegal access judging part 14 of the detection. The state of the signal SCL indicates the signal state of the interface part 24.

Based on the monitoring result by the memory access monitoring part 12 and the monitoring result by the signal change monitoring part 13, the illegal access judging part 14 judges the presence/absence of an illegal access to the memory 30. As mentioned above, the illegal access judging part 14 can obtain those monitoring results by a notification from the memory access monitoring part 12 and a notification from the signal change monitoring part 13.

Upon being notified by the signal change monitoring part 13 that the signal sig_i has entered the Low (0) state for example, the illegal access judging part 14 judges the signal state of the signal scl_oe_n reported from the memory access monitoring part 12, and if the signal scl_oe_n is in the High (1) state (that is, the memory 30 is not accessed by the memory control part 11), judges that there has been an illegal access to the memory 30. Also, upon judging that there is an illegal access, the illegal access judging part 14 notifies the signal control part 15 that there has been an illegal access.

Not being limited to this example, when the memory 30 is not accessed from the memory control part 11, and there is a change in the signal state of the interface part 24, the illegal access judging part 14 only needs to judge that there has been an illegal access. Also, including such a case as this, when there is a difference between the access state from the memory control part 11 to the memory 30 and the signal state of the interface part 24, the illegal access judging part 14 can judge that there has been an illegal access.

In the configuration example shown in FIG. 1, upon being notified by the illegal access judging part 14 that there has been an illegal access, the signal control part 15 brings the bidirectional buffer 18 into an output state by setting a signal sig_o output to the input terminal of the bidirectional buffer 18 to the Low (0) state and also setting an output enable signal sig_oe_n to the bidirectional buffer 18 to the Low (0) state. Thereby, at the occurrence of an illegal access, the signal control part 15 can forcibly set the signal SCL to the same state as the state of the signal sig_o, that is the Low (0) state. Not being limited to this example, when an illegal access has been detected by the illegal access detection part 19, the signal control part 15 only needs to switch the signal state of the interface part 24 to a write-inhibited state from a write-allowed state.

Here, the bidirectional buffer 18 is explained. The bidirectional buffer 18 is a buffer that is connected to the signal control part 15 and the SCL wire as well as the signal change monitoring part 13, and is used by being switched between an input state and the output state according to the state of the output enable signal sig_oe_n output from the signal control part 15. For example, the bidirectional buffer 18 can be set to the input state when the signal sig_oe_n is in the High (1) state, and to the output state when the signal sig_oe_n is in the Low (0) state.

In the input state, the bidirectional buffer 18 inputs the signal SCL flowing in the SCL wire and outputs to the signal change monitoring part 13. The signal output to the signal change monitoring part 13 is denoted as the sig_i as mentioned above. By the signal control part 15 setting the output enable signal sig_oe_n to the High (1) state, the output-side buffer of the bidirectional buffer 18 can be set to the Hi-z state, and the signal SCL can be input from the input-side buffer of the bidirectional buffer 18. Thereby, the bidirectional buffer 18 can output the signal SCL input to the signal change monitoring part 13 as the signal sig_i.

In the output state, the bidirectional buffer 18 outputs the signal sig_o output from the signal control part 15 to the SCL wire. Specifically, by the signal control part 15 setting the output enable signal sig_oe_n to the Low (0) state, the bidirectional buffer 18 can output the signal sig_o to the SCL wire and set the signal SCL to the same state as the state of the signal sig_o.

Figure 2:
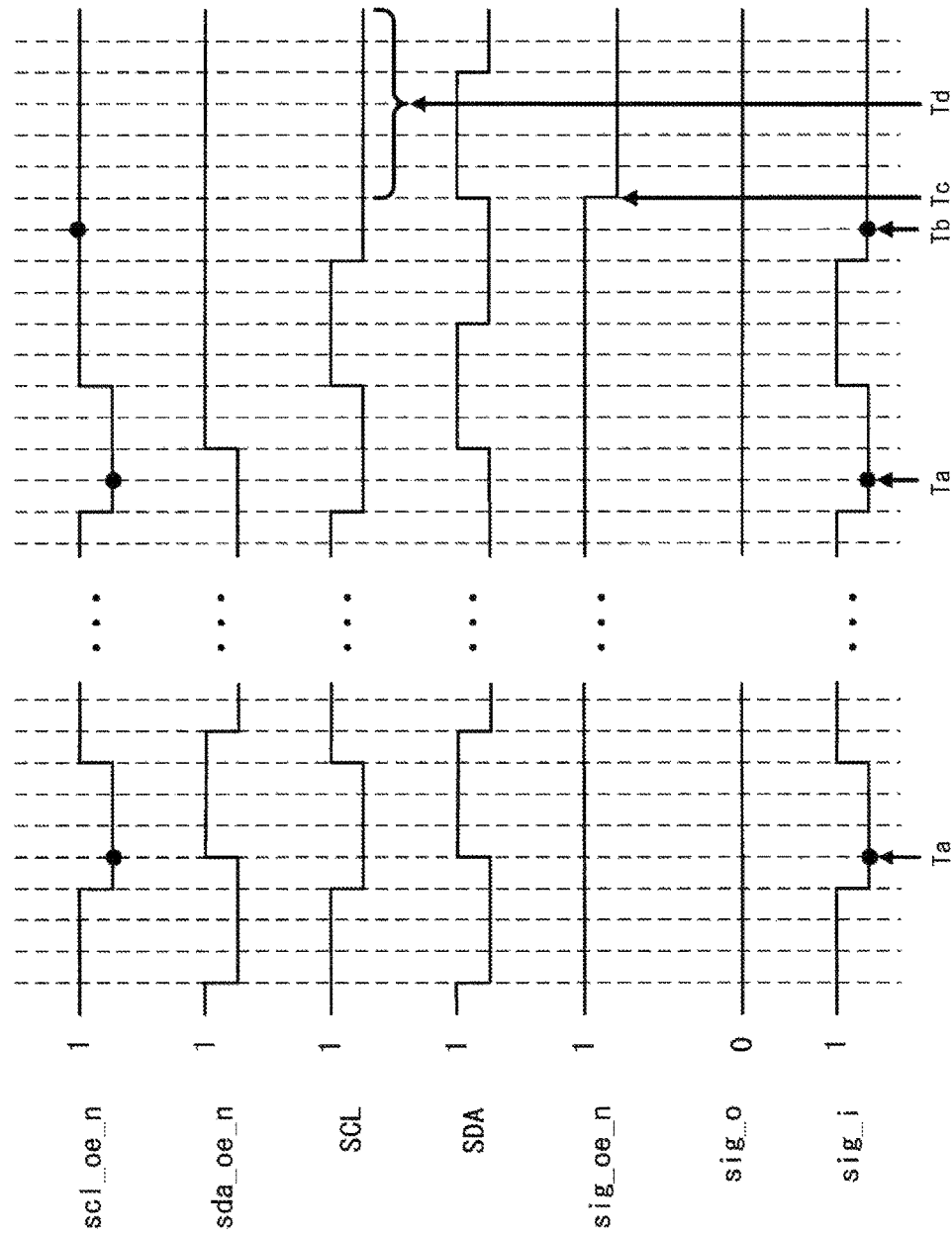
FIG. 2 is a timing chart showing an example of the signal states of signal wires in the memory device shown in FIG. 1.

Next, explained referring to FIGS. 2-6 are changes in the signal states of the signal wires in the memory device 1 having such a configuration as mentioned above. FIG. 2 is a timing chart showing an example of the signal states of the signal wires in the memory device 1. Also, FIGS. 3, 4, 5, and 6 are diagrams showing the signal states of the signal wires at timing Ta, Tb, Tc, and Td shown in FIG. 2, respectively.

Figure 3:
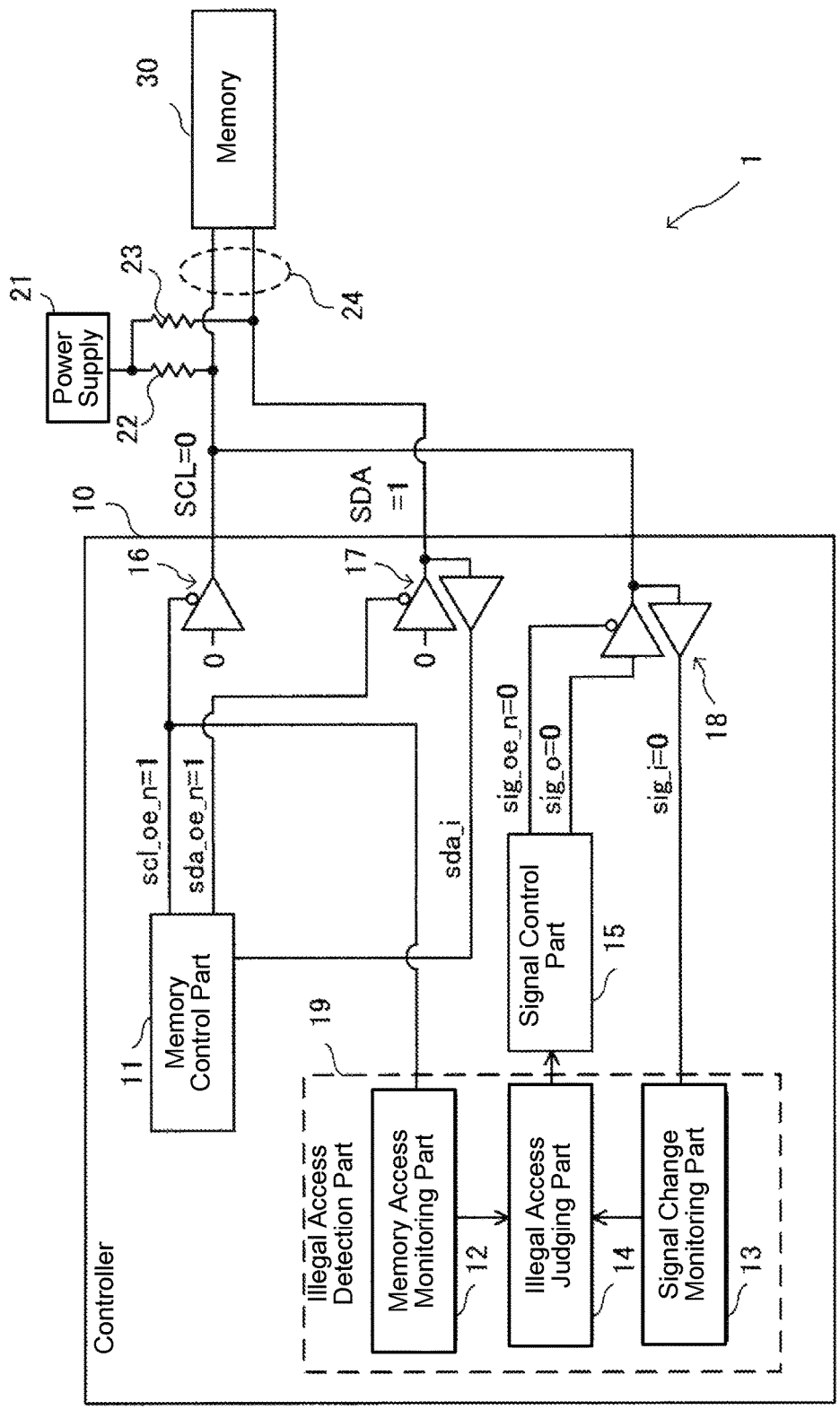
FIG. 3 is a diagram showing the signal states of the signal wires at timing Td shown in FIG. 2.

During a normal access to the memory 30 (when it is not an illegal access), as shown in the signal states at the timing Ta in FIG. 2 and in FIG. 3, the signal SCL enters the Low (0) state by setting scl_oe_n=0 and into the High (1) state by setting scl_oe_n=1. The High (1) state in this case is due to the pull-up resistor 22. In the same manner, during the normal access, as shown in the signal states at the timing Ta in FIG. 2, the signal SDA enters the Low (0) state by setting sda_oe_n=0 and into the High (1) state by setting sda_oe_n=1. The High (1) state in this case is due to the pull-up resistor 23.

Also, the signal sig_oe_n becomes 1 at the startup time of the controller 10, and becomes 0 if an illegal access is detected. Therefore, during the normal access, sig_oe_n remains as 1. By setting sig_oe_n=1, the bidirectional buffer 18 enters the input state, the SCL wire is connected to the signal wire where the signal sig_i flows (the signal wire between the bidirectional buffer 18 and the signal change monitoring part 13), and the signal sig_i comes to vary in the same manner as the signal SCL.

Therefore, as shown in the signal states at the timing Ta in FIG. 2, during the normal access to the memory 30 (when sig_oe_n=1), if the signal SCL is in the Low (0) state, the signal sig_i enters the Low (0) state. Here, if the signal sig_i is in the Low (0) state, it indicates that the signal scl_oe_n is in the Low (0) state. In the same manner, during the normal access, if the signal SCL is in the High (1) state, the signal sig_i enters the High (1) state. Here, if the signal sig_i is in the High (1) state, it indicates that the signal scl_oe_n is in the High (1) state.

On the other hand, upon detecting an illegal access, by setting sig_oe_n=0, the bidirectional buffer 18 enters the output state, and the signal wire where the signal sig_o flows is connected with the SCL wire. Therefore, as shown in the signal states at the timing Tc in FIG. 2, when an illegal access has been detected (when sig_oe_n=0), if the signal sig_o is in the Low (0) state, the signal SCL enters the Low (0) state.

The processing upon detecting an illegal access to the memory 30 is explained. Once an illegal access to the memory 30 is made, as shown in the signal states at the timing Tb in FIG. 2, even if the signal sig_i is in the Low (0) state, the scl_oe_n signal enters the High (1) state. Based on this state, the illegal access judging part 14 issues the judgement result that there is an illegal access.

Once it is judged that there is an illegal access, as shown in the signal states at the timing Tc in FIG. 2, the signal sig_oe_n enters the Low (0) state, and the signal SCL enters the Low (0) state by the signal sig_o. Hereafter, as shown in the signal states at the timing Td in FIG. 2 and in FIG. 3, the signal SCL remains in the Low (0) state and cannot change to the High (1) state. For example, at this time, as shown in the signal states at the timing Td in FIG. 2, even if the signal SDA had changed by the illegal access, because the signal SCL does not change to the High (1) state, information stored in the memory 30 will never be rewritten.

Figure 4:
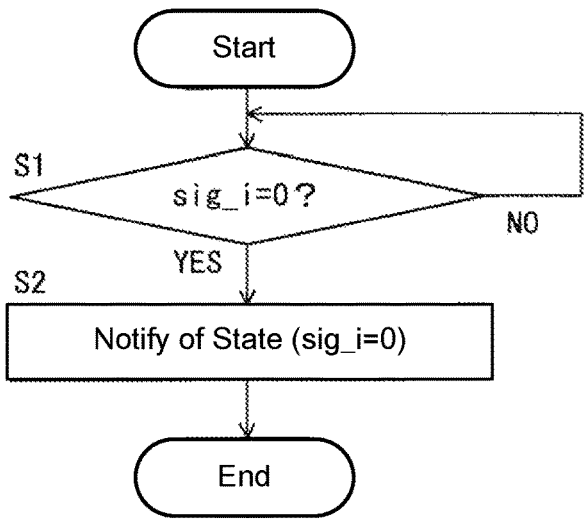
FIG. 4 is a flow chart showing an example of the monitoring process by a signal change monitoring part in the memory device shown in FIG. 1.
Figure 5:
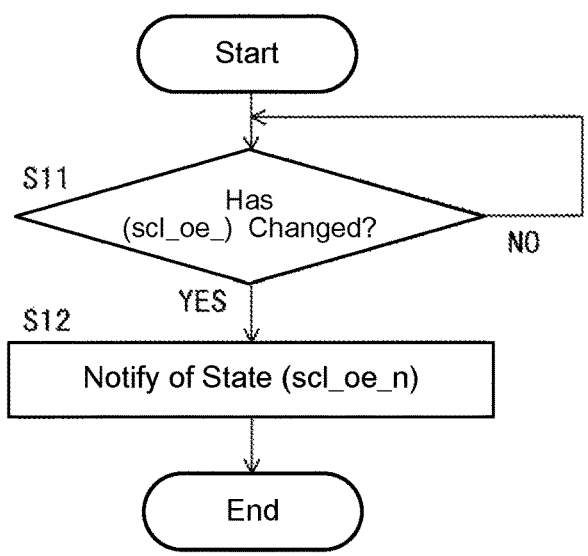
FIG. 5 is a flow chart showing an example of the monitoring process by a memory access monitoring part and an example of the write inhibition process by a signal control part in the memory device shown in FIG. 1.
Figure 6:
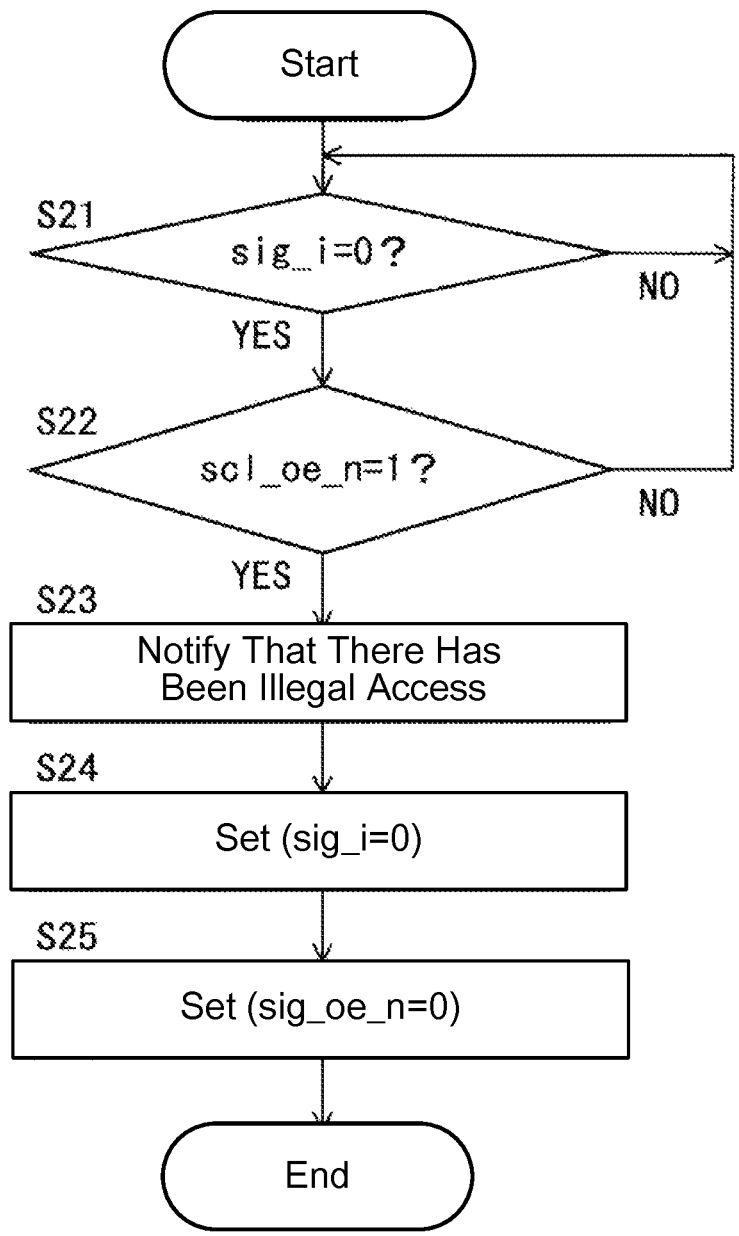
FIG. 6 is a flow chart showing an example of the judgement process by an illegal access judging part in the memory device shown in FIG. 1.

Next, explained referring to FIG. 4-9 is an example of processing in the controller 10 having such a configuration as mentioned above. FIG. 4 is a flow chart showing an example of the monitoring process by the signal change monitoring part 13, FIG. 5 is a flow chart showing an example of the monitoring process by the memory access monitoring part 12 and the write inhibition process by the signal control part 15, and FIG. 6 is a flow chart showing an example of the judgment process by the illegal access judging part 14.

As shown in FIG. 4, the signal change monitoring part 13 monitors the state of the signal sig_i (S1). In this example, in S1, the signal change monitoring part 13 judges whether the signal sig_i is in the Low (0) state. If the signal sig_i is in the High (1) state (in the case of NO in S1), the signal change monitoring part 13 continues monitoring. If the signal sig_i has entered the Low (0) state (in the case of YES in S1), the signal change monitoring part 13 notifies the illegal access judging part 14 that the signal sig_i has entered the Low (0) state (S2) and ends the process.

As shown in FIG. 5, the memory access monitoring part 12 monitors the state of the signal scl_oe_n (S11). In this example, in S11, the memory access monitoring part 12 judges whether the state of the signal scl_oe_n has changed. If the signal scl_oe_n has not changed (in the case of NO in S11), the memory access monitoring part 12 continues monitoring. If the signal scl_oe_n has changed (in the case of YES in S11), the memory access monitoring part 12 notifies the illegal access judging part 14 of the state of the signal scl_oe_n (the signal state after the change) (S12) and ends the process.

As shown in FIG. 6, the illegal access judging part 14 monitors a notification output from the signal change monitoring part 13 indicating that the signal sig_i has entered the Low (0) state, and based on the presence/absence of this notification, judges whether the signal sig_i is in the Low (0) state (S21). If this notification is absent (in the case of NO in S21), the illegal access judging part 14 continues monitoring. If there is a notification indicating that the signal sig_i has entered the Low (0) state (in the case of YES in S21), the illegal access judging part 14 judges the state of the signal scl_oe_n reported from the memory access monitoring part 12 (S22). In this example, in S22, the illegal access judging part 14 judges whether the signal scl_oe_n is in the High (1) state.

If the signal scl_oe_n is in the Low (0) state (in the case of NO in S22), the illegal access judging part 14 judges that the signal sig_i entered the Low (0) state because of the memory control part 11 accessing the memory 30 and not because of an illegal access, returns to S21, and waits for a notification output from the signal change monitoring part 13.

On the other hand, if the signal scl_oe_n is in the High (1) state (in the case of YES in S22), the illegal access judging part 14 judges that an illegal access has been made to the memory 30 because the signal sig_i is in the Low (0) state while the memory control part 11 is not accessing the memory 30, and notifies the signal control part 15 that there has been an illegal access (S23).

Next, the signal control part 15 sets the signal sig_o to the Low (0) state and outputs it (S24), and sets the signal sig_oe_n to the Low (0) state to bring the bidirectional buffer 18 into the output state (S25). Note that the order of S24 and S25 does not matter. By the processes in S24 and S25, the signal SCL of the SCL wire enters the Low (0) state. Hereafter also, the signal SCL is fixed to the Low (0) state and cannot be changed to the High (1) state, which disables any illegal writing to the memory 30. Note that as shown in FIG. 2, the signal sig_o can be always set to the Low (0) state.

As explained above, according to the signal state of the interface part 24 and the access state from the memory control part 11 (the control state in the memory control part 11), the controller 10 judges the presence/absence of an illegal access to the memory 30, and if there is an illegal access to the memory 30, forcibly drives the signals in the interface part 24 (the control signals to the memory 30) to the Low (0) state. Therefore, in the memory device 1 having the controller 10, even when an illegal access to the memory 30 is made by adding a wiring to any of the signal wires in the interface part 24, it can be detected, and writing to the memory 30 can be disabled, which can prevent illegal rewriting of information stored in the memory 30.

In this manner, the controller 10 and the memory device 1 of Embodiment 1 achieves an effect, as one of preventive measures of illegal writing to memory, of preventing illegal rewriting of information stored in the memory 30 by an illegal access to the memory 30 from any of the signal wires controlling the memory 30.

Also, not being limited to the configuration example shown in FIG. 1, the controller 10 and the memory device 1 of Embodiment 1 can have a circuit of another configuration that can achieve equivalent functions to those of the shown circuit. Also, the memory control device and the memory device of Embodiment 1 can, for example, adopt such configurations as in Modifications 1-6 below or configurations that achieve equivalent functions to those of Modifications 1-6, in which case also the above-mentioned effect is achieved.

<Modification 1>

In the processing examples shown in FIGS. 2-9, when an illegal access has been detected, the signal control part 15 of the controller 10 drives the signal SCL to be fixed to the Low (0) state (that is, the signal level of the SCL wire to be fixed to the Low (0) level), thereby setting the signal state of the interface part 24 to the write-inhibited state.

However, in fixing the signal level (voltage level) of the SCL wire that is a clock signal wire, the signal control part 15 can fix it not only to the Low (0) state but also to the High (1) state. For example, when notified by the illegal access judging part 14 that there has been an illegal access, the signal control part 15 brings the bidirectional buffer 18 into the output state by setting the signal sig_o output to the input terminal of the bidirectional buffer 18 to the High (1) state and also setting the output enable signal sig_oe_n to the bidirectional buffer 18 to the Low (0) state. Thereby, upon the occurrence of an illegal access, the signal control part 15 can set the signal SCL to the same High (1) state as the state of the signal sig_o. Also, the signal level to fix to only needs to be a predetermined level, and even if it is another level between Low (0) and High (1), it only needs to be a level that the memory 30 side can judge which of High (1) or Low (0) it corresponds to.

As explained above, the signal control part 15 can be configured so that in order to set the signal state of the interface part 24 to the write-inhibited state, the signal level of the clock signal wire can be fixed to the predetermined signal level.

<Modification 2>

Figure 7:
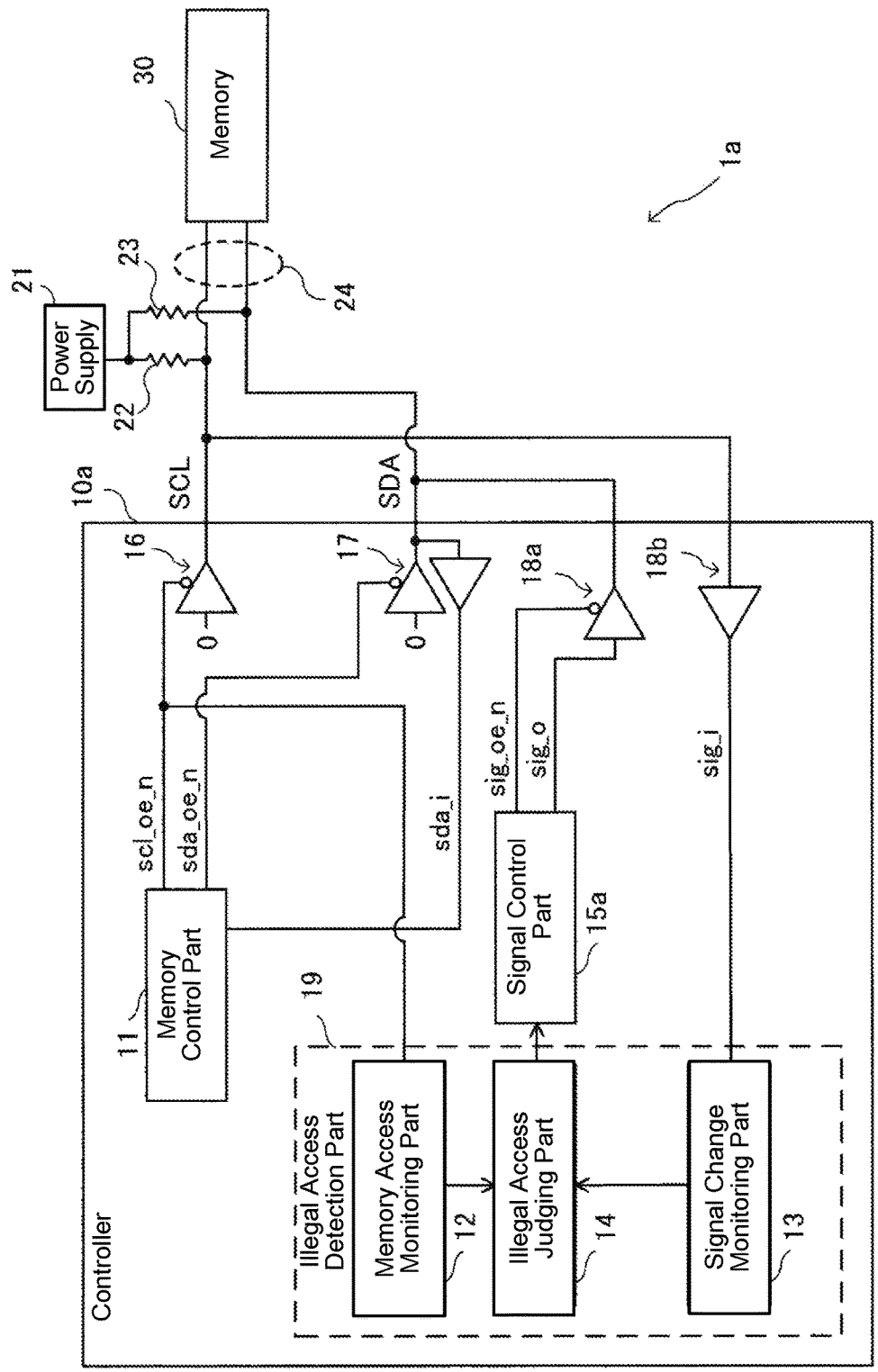
FIG. 7 is a schematic diagram showing another configuration example (Modification 2) of the memory device of Embodiment 1.

FIG. 7 is a schematic diagram showing another configuration example (Modification 2) of the memory device of Embodiment 1. Although a memory device of Modification 2 is explained centering on its differences from the memory device 1 shown in FIG. 1, a variety of examples mentioned above can be applied. Also, in FIG. 7, components that are identical or correspond to the components shown in FIG. 1 are given the same codes as the codes shown in FIG. 1 or codes having a suffix added to the codes shown in FIG. 1.

In the memory device 1 shown in FIG. 1 and its Modification 1, the signal control part 15 of the controller 10 sets the signal state of the interface part 24 to the write-inhibited state by fixing the signal SCL to a predetermined level such as Low (0) upon detecting an illegal access.

As opposed to this, a controller 10a of a memory device 1a of Modification 2 is configured, in the controller 10 shown in FIG. 1, so as to fix the signal level of the SDA wire to a predetermined level such as Low (0) upon detecting an illegal access.

Specifically, as shown in FIG. 7, in the controller 10 shown in FIG. 1, the controller 10a has, instead of the bidirectional buffer 18, an output buffer 18a connected to a signal control part 15a and the SDA wire, and an input buffer 18b connected to the SCL wire and the signal change monitoring part 13.

Then, when notified by the illegal access judging part 14 that there has been an illegal access, the signal control part 15a in Modification 2 brings the output buffer 18a into the output state by setting the signal sig_o output to the input terminal of the output buffer 18a to the Low (0) state and setting the output enable signal sig_oe_n to the output buffer 18a to the Low (0) state. Thereby, upon the occurrence of an illegal access, the signal control part 15a can forcibly set the signal SCL to the same state as the state of the signal sig_o, for example, a predetermined signal level such as Low (0). On the other hand, during the normal access, the signal control part 15a can leave the output enable signal sig_oe_n to the output buffer 18a in the High (1) state.

Also, although not shown, by combining the configuration example shown in FIG. 1 and Modification 2 shown in FIG. 7, the memory device of Embodiment 1 can also be configured so that upon detecting an illegal access, the signal control part fixes both the signal level of the SCL wire and the signal level of the SDA wire to predetermined signal levels. Note that the signal control part of such a configuration as this can fix the SCL wire and the SDA wire to either the same level or different levels.

As explained above, the memory device of Embodiment 1 can be configured so that the signal control part fixes signal levels of the signal wires in the interface part 24 to predetermined signal levels in order to set the signal state of the interface part 24 to the write-inhibited state.

<Modification 3>

Figure 8:
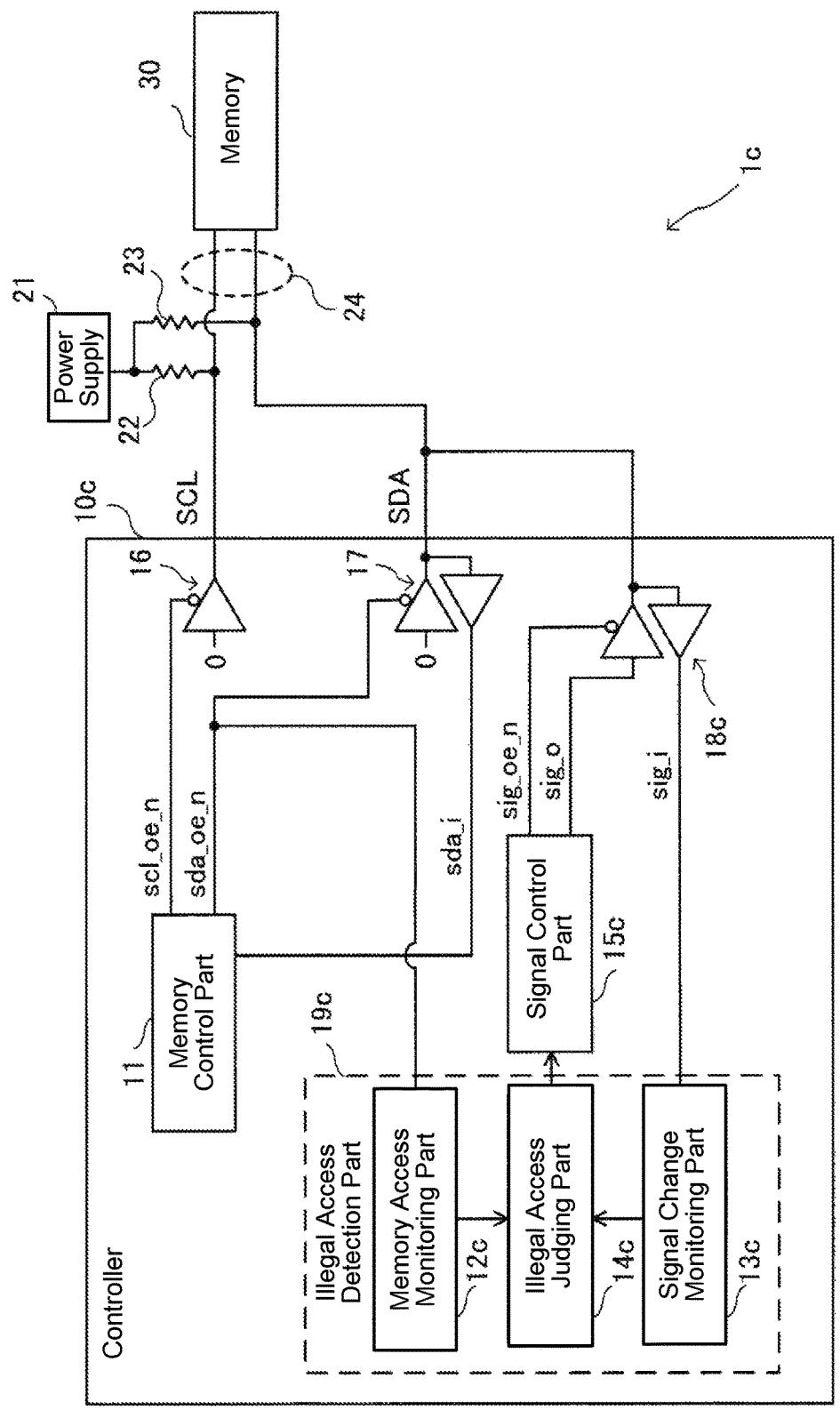
FIG. 8 is a schematic diagram showing another configuration example (Modification 3) of the memory device of Embodiment 1.

FIG. 8 is a schematic diagram showing another configuration example (Modification 3) of the memory device of Embodiment 1. Although a memory device of Modification 3 is explained centering on its differences from the memory device 1 shown in FIG. 1, a variety of examples mentioned above can be applied. Also, in FIG. 8, components that are identical or correspond to the components shown in FIG. 1 are given the same codes as the codes shown in FIG. 1 or codes having a suffix added to the codes shown in FIG. 1.

In the memory device 1 shown in FIG. 1 and its Modification 1, in order to detect an illegal access, using the result of monitoring the signal SCL that is a clock signal, that is, according to the signal level of the clock signal wire, the illegal access detection part 19 detects an illegal access to the memory 30, and fixes the signal level of the SCL wire upon detecting the illegal access.

As opposed to this, a controller 10c of a memory device 1c of Modification 3 shown in FIG. 8 has, in the controller 10 shown in FIG. 1, an illegal access detection part 19c that detects an illegal access to the memory 30 according to the signal level of a data signal wire, and a signal control part 15c that fixes the signal level of the SDA wire upon detecting an illegal access in the same manner as in the memory device of Modification 2.

Specifically, as shown in FIG. 8, in the controller 10 shown in FIG. 1, the controller 10c has a configuration where instead of the bidirectional buffer 18 connected to the SCL wire, the signal SDA is made the monitoring target. That is, the controller 10c has a bidirectional buffer 18c connected to the SDA wire, and also has a memory access monitoring part 12c connected to the signal wire that outputs the output enable signal sda_oe_n instead of the signal wire that outputs the output enable signal scl_oe_n.

The illegal access detection part 19c has, along with the memory access monitoring part 12c, a signal change monitoring part 13c and an illegal access judging part 14c. The processing by the illegal access detection part 19c is different from the processing by the illegal access detection part 19 shown in FIG. 1 in that the monitoring target signal has become the signal SDA. Also, the processing by the signal control part 15c is different from the processing by the signal control part 15 shown in FIG. 1 in that the output destination of the signal sig_o has become the SDA wire.

Besides, the controller of the memory device of Embodiment 1 can be configured so as to make the signal SDA the monitoring target and fix the signal level of the SCL wire upon detecting an illegal access. Although not shown, this controller can adopt a configuration, for example, where the signal wires that output the output enable signals scl_oe_n and sda_oe_n are mutually switched, and the SCL wire and the SDA wire of the interface part 24 are also mutually switched in the configuration example shown in FIG. 7.

<Modification 4>

Figure 9:
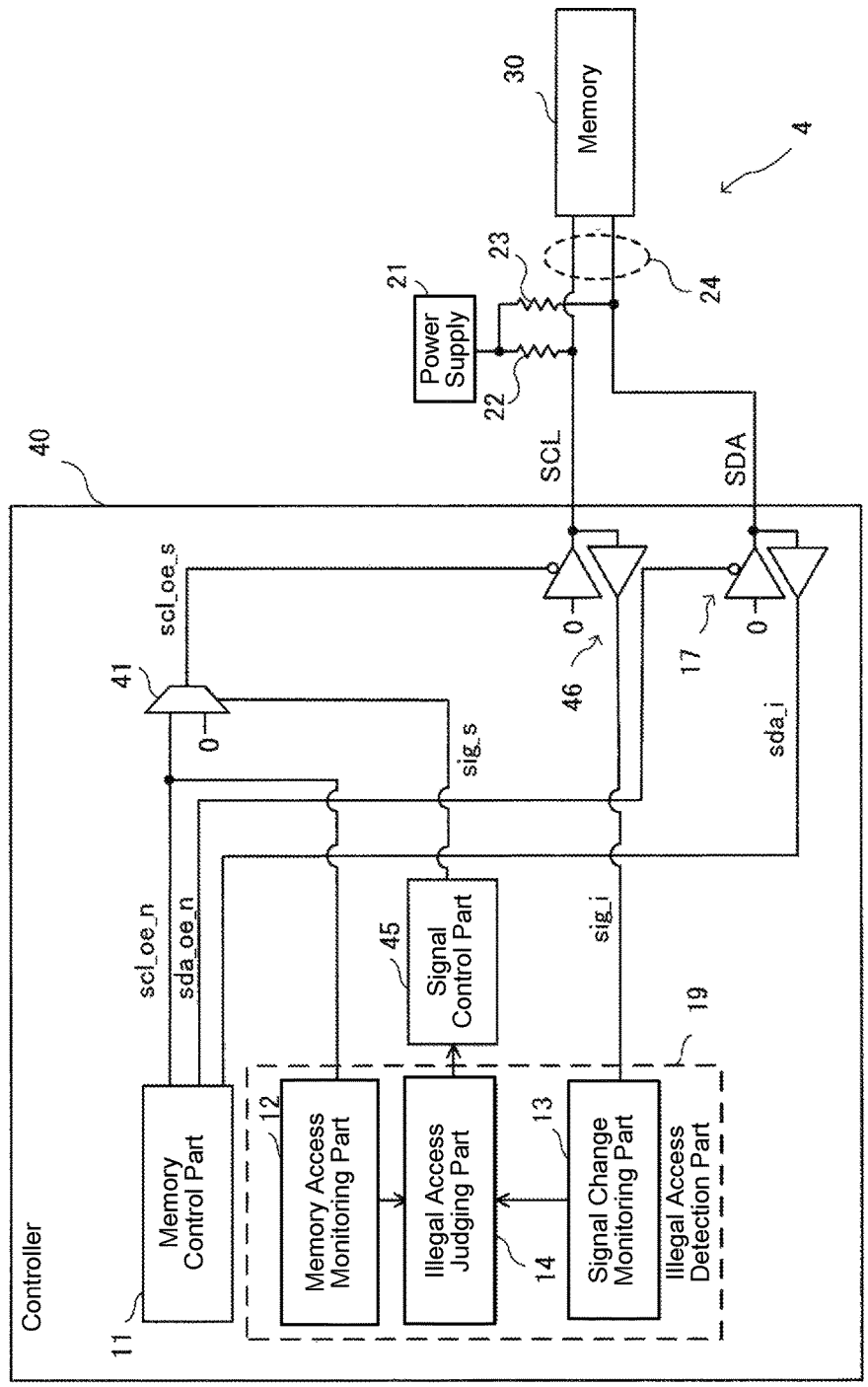
FIG. 9 is a schematic diagram showing another configuration example (Modification 4) of the memory device of Embodiment 1.

FIG. 9 is a schematic diagram showing another configuration example (Modification 4) of the memory device of Embodiment 1. Although a memory device of Modification 4 is explained centering on its differences from the memory device 1 shown in FIG. 1, a variety of examples mentioned above can be applied. Also, in FIG. 9, components that are identical or correspond to the components shown in FIG. 1 are given the same codes as the codes shown in FIG. 1.

In the memory device 1 shown in FIG. 1, in the controller 10, as illustrated with the bidirectional buffer 18, a dedicated terminal for monitoring an illegal access and a dedicated terminal for fixing the signal level of the SCL wire or the SDA wire are provided. Also, in FIG. 8 the bidirectional buffer 18c has this dedicated terminal, and in FIG. 7 the output buffer 18a and the input buffer 18b have this dedicated terminal.

As opposed to this, as shown in FIG. 9, by making the output buffer that becomes a terminal for the signal SCL in a controller 40 as a bidirectional buffer 46, the memory device 4 of Modification 4 monitors an illegal access with the signal SCL terminal and also fixes the signal level through the terminal upon an illegal access.

Specifically, as shown in FIG. 9, the controller 40 of Modification 4 can have a memory control part 11, a bidirectional buffer 17, an illegal access detection part 19, a multiplexer (MUX) 41, a signal control part 45, and the bidirectional buffer 46. The signal control part 45 outputs to the MUX 41 a selection signal sig_s for switching an output signal sig_o output from the bidirectional buffer 46 between the output enable signal scl_oe_n and "0". The signal control part 45 outputs such a selection signal sig_s as to select the output enable signal scl_oe_n output from the memory control part 11 during the normal access, and outputs such a selection signal sig_s as to select "0" upon detecting an illegal access. Following the selection signal sig_s output from the signal control part 45, the MUX 41 switches the output signal scl_oe_s between the signal scl_oe_n and "0" that is a fixed level, and outputs it to the bidirectional buffer 46.

By setting the signal scl_oe_s to the High (1) state, the MUX 41 can bring the output terminal of the bidirectional buffer 46 connected to the SCL wire into the Hi-z state and set the signal SCL into the High (1) state by the pull-up resistor 22. Also, by the output terminal connected to the SCL wire entering the Hi-z state, the bidirectional buffer 46 can be switched from the output state to the input state.

In the input state, the bidirectional buffer 46 outputs the signal SCL as the signal sig_i to the signal change monitoring part 13. By monitoring the state of the signal sig_i output from the bidirectional buffer 46, the signal change monitoring part 13 monitors the state of the signal SCL flowing in the SCL wire. In this manner, when the memory control part 11 is not accessing the memory 30, by the bidirectional buffer 46 entering the input state, the signal change monitoring part 13 can monitor the signal SCL. Then, upon detecting that the signal sig_i has changed from the High (1) state to the Low (0) state (that is, the signal SCL has changed from the High (1) state to the Low (0) state) for example, the signal change monitoring part 13 notifies the illegal access judging part 14 of the detection.

When notified by the signal change monitoring part 13 that the signal sig_i has entered the Low (0) state for example, the illegal access judging part 14 judges the signal state of the signal scl_oe_n reported from the memory access monitoring part 12, and if the signal scl_oe_n is in the High (1) state (that is, the memory 30 is not accessed from the memory control part 11), judges that there has been an illegal access to the memory 30. Also, upon judging that an illegal access has occurred, the illegal access judging part 14 notifies the signal control part 45 that there has been an illegal access.

On the other hand, by setting the signal scl_oe_s to the Low (0) state, the MUX 41 can have the bidirectional buffer 46 output "0" that is a fixed level and set the signal SCL to the Low (0) state. Upon being notified by the illegal access judging part 14 of an illegal access detection, the signal control part 45 can have the bidirectional buffer 46 always output "0" that is a fixed level by having the MUX 41 always output "0", and can fix the signal SCL to the Low (0) state.

Also, although the memory device 4 shown in FIG. 9 has the bidirectional buffer 46 installed as the terminal for the signal SCL of the controller 40 (the output terminal to the SCL wire), Modification 4 can also adopt Modification 3 for example. That is, the memory device of Modification 4 can make a bidirectional buffer as the terminal for the signal SDA of the controller, monitor an illegal access with the terminal for the signal SDA, and fix the signal level from that terminal also upon an illegal access.

<Modification 5>

In the memory device 1 shown in FIG. 1 and its Modifications 1-4, the output enable signal scl_oe_n or sda_oe_n is adopted as a signal monitored by the memory access monitoring part for detecting an illegal access, and the memory access monitoring part judges the presence/absence of an access to the memory 30 based on the output enable signal output from the memory control part 11. Instead of this, another configuration can be made so that the memory control part 11 directly outputs a signal indicating an access situation to the memory access monitoring part, and based on this signal, the memory access monitoring part judges the presence/absence of an access to the memory 30.

<Modification 6>

In the memory device 1 shown in FIG. 1 and its Modifications 1-5, it was presupposed that the memory 30 was nonvolatile memory. However, volatile memory can be adopted as the memory that becomes the control target of the memory control device of Embodiment 1 (for example, the memory 30 shown in FIG. 1 etc.). If the control target memory is volatile memory, although information stored there becomes information to be erased by resetting (for example, temporary setting information, etc.), the above-mentioned effect of preventing information rewriting by an illegal access can be obtained.

<<2>> Embodiment 2

Figure 10:
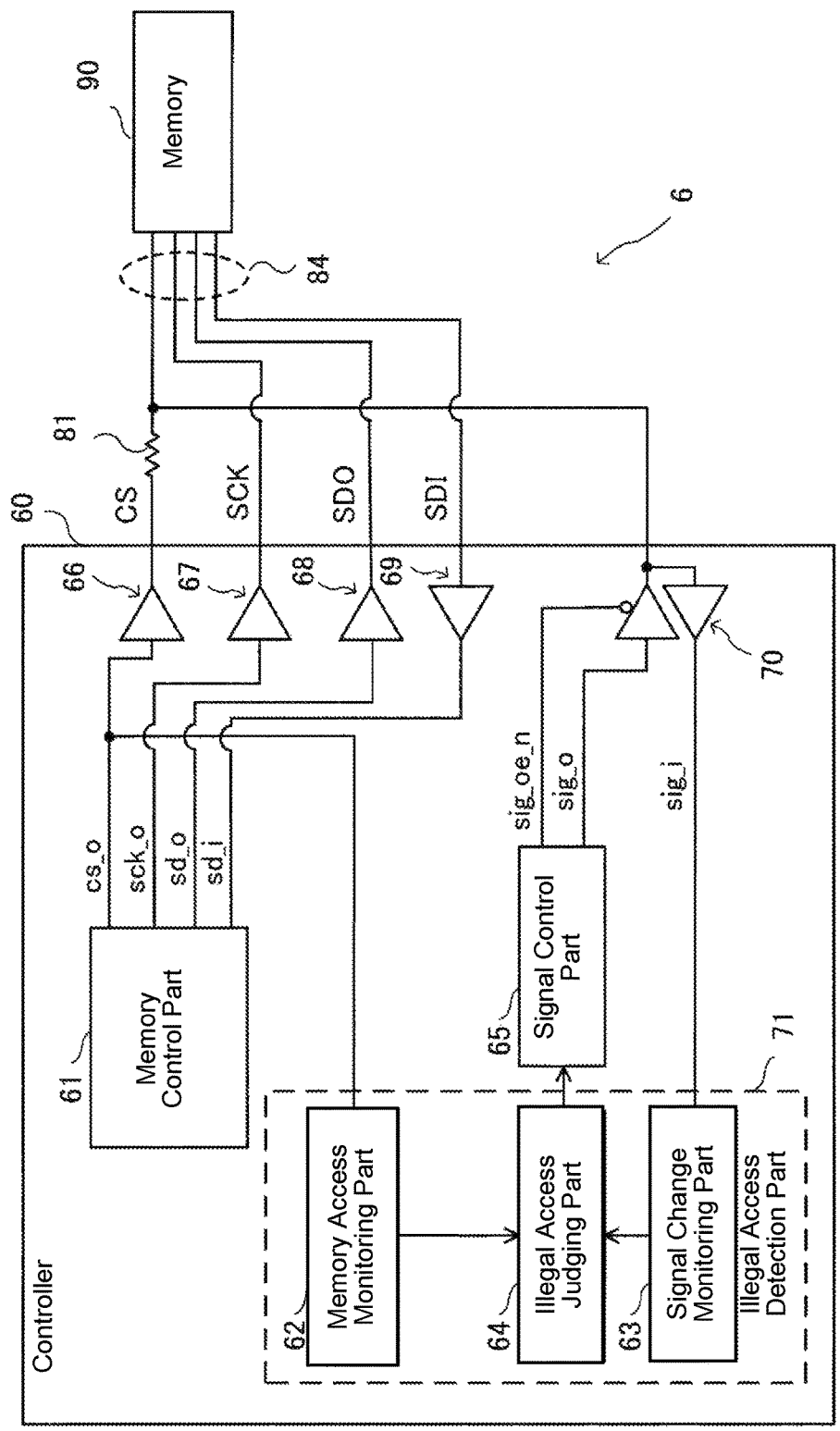
FIG. 10 is a schematic diagram showing a configuration example of a memory device of Embodiment 2.

A memory control device and a memory device of Embodiment 2 are explained referring to FIG. 10. FIG. 10 is a schematic diagram showing a configuration example of the memory device of Embodiment 2. Although the memory device of Embodiment 2 is explained centering on its differences from the memory device 1 shown in FIG. 1, in Embodiment 2, a variety of examples mentioned above (including Modifications 1-6) can be applied.

In Embodiment 1, it is presupposed that the interface part 24 has a I²C bus. As opposed to this, as shown in FIG. 10, the memory device 6 of Embodiment 2 has a controller 60, an interface part 84 having an SPI (Serial Peripheral Interface) bus, and memory 90. The interface part 84 has multiple signal wires and performs communication between the controller and the memory by a communication regulation based on the SPI standard that is a synchronous serial communication regulation.

Also, the memory device 6 can be built in a variety of electronic apparatuses, and controls the memory 90 obeying commands from an unshown CPU installed in the electronic apparatus. Note that the controller 60 has an unshown power supply, and the memory 90 is also connected to this power supply or another unshown power supply.

The interface part 84 has a chip select signal wire (CS wire) for a chip select signal (signal CS), a serial clock signal wire (CSK wire) for a serial clock signal (signal SCK), a data signal wire (SDO wire) for sending a serial data signal (signal SDO), and a data signal wire (SDI wire) for receiving a serial data signal (signal SDI). Besides, the interface part 84 has an unshown GND wire. Also, in the memory device 6 shown in FIG. 10, the output terminal of the controller 60 is not made an open drain or an open collector. However, the output terminal of the controller 60 can be made an open drain or an open collector in the same manner as in the configuration example shown in FIG. 1.

The CS wire is a signal wire to send the CS signal that selects a chip. Because the chip indicates a device that is connected to the controller 60 that becomes a master, and becomes a slave such as the memory 90, the CS signal is also called a slave select (SS) signal. The CS wire in the memory device 6 is a select signal wire to send to the memory 90 the select signal that selects the memory 90 as the control target. Also, the controller 60 that is the master synchronizes with the signal SCK, sends the signal SDO through the SDO wire to the memory 90 that is the slave, and simultaneously receives the signal SDI through the SDI wire from the memory 90. Therefore, the signal SDO is also called a signal MOSI (Master Out Slave In), and the signal SDI is also called a signal MISO (Master In Slave Out).

Also, as shown in FIG. 10, the controller 60 has a memory control part 61, a signal control part 65, an output buffer 66, an output buffer 67, an output buffer 68, an input buffer 69, a bidirectional buffer 70, and an illegal access detection part 71. The illegal access detection part 71 can have a memory access monitoring part 62, a signal change monitoring part 63, and an illegal access judging part 64. Note that the memory device 6 shown in FIG. 10 is the one where each of the components of the memory device 1 is changed so as to be applicable to a communication regulation based on the SPI standard, and the components in FIG. 10 having the same names as the components in FIG. 1 are explained centering on their differences.

Obeying a command from the CPU installed in the electronic apparatus, the memory control part 61 controls the memory 90 through the interface part 84 according to the communication regulation based on the SPI standard. Specifically, if this command is to the memory 90, the memory control part 61 outputs a chip select signal cs_o to the output buffer 66, and outputs a serial clock signal sck_o to the output buffer 67. By outputting the chip select signal cs_o, the memory control part 61 outputs the signal CS to the memory 90 through the CS wire to which the output terminal of the output buffer 66 is connected, thereby notifying that the memory 90 is made the control target. The signal CS is output to the memory 90 while the control target is set to the memory 90. By outputting the serial clock signal sck_o, the memory control part 61 outputs the signal SCK that is a clock signal to the memory 90 through the SCK wire to which the output terminal of the output buffer 67 is connected.

The output buffer 66 is a buffer that controls the signal CS flowing in the CS wire, and changes the signal CS to the Low (0) state or the High (1) state by the chip select signal cs_o. For example, by the memory control part 61 setting the chip select signal cs_o to the High (1) state, the output buffer 66 sets the signal CS to the High (1) state, and by setting the chip select signal cs_o to the Low (0) state, "0" is output from the output buffer 66, allowing the signal CS to enter the Low (0) state. Also, the output buffer 67 is a buffer that controls the signal SCK flowing in the SCK wire, and changes the signal SCK to the Low (0) state or the High (1) state by the serial clock signal sck_o. For example, by the memory control part 61 setting the serial clock signal sck_o to the High (1) state, the output buffer 67 sets the signal SCK to the High (1) state, and by setting the serial clock signal sck_o to the Low (0) state, "0" is output from the output buffer 67, allowing the signal SCK to enter the Low (0) state.

Also, responding to the above-mentioned command, the memory control part 61 outputs a data signal sd_o to the output buffer 68 and inputs a data signal sd_i from the input buffer 69 following the above-mentioned clock. The output buffer 68 outputs the data signal sd_o configured of a combination of High (1) and Low (0) through the SDO wire to the memory 90 (outputs as the signal SDO). Also, the input buffer 69 inputs from the memory 90 the signal SDI configured of a combination of High (1) and Low (0) through the SDI wire (inputs as the data signal sd_i), and outputs it to the memory control part 61.

Through such a control by the memory control part 61, the controller 60 can access the memory 90 and control reading and writing of information. Note that the memory control part 61 can have a shift register (not shown) that holds data signals input/output by the input buffer 69 and the output buffer 68.

The illegal access detection part 71 in Embodiment 2 detects an illegal access to the memory 90 according to the access state from the memory control part 61 to the memory 90 and the signal level of the CS wire. Also, the signal control part 65 in Embodiment 2 sets the signal state of the interface part 84 to the write-inhibited state by fixing the signal level of the CS wire to a predetermined signal level. An example of such processing as this in the illegal access detection part 71 and the signal control part 65 is specifically explained.

The memory access monitoring part 62 monitors the access state from the memory control part 61 to the memory 90. For example, as shown in FIG. 10, the memory access monitoring part 62 is connected to the signal wire to which the chip select signal cs_o is output, monitors changes in the chip select signal cs_o output from the memory control part 61, and if there is a change in the signal cs_o, notifies the illegal access judging part 64 of the state of the signal cs_o (signal state). The state of the chip select signal cs_o indicates the access state from the memory control part 61 to the memory 90, and in this example, if the chip select signal cs_o is in the High (1) state, it is regarded that the memory 90 is not accessed by the memory control part 61.

The signal change monitoring part 63 monitors changes in the signal state of the interface part 84. For example, as shown in FIG. 10, by monitoring the state of the signal sig_i output from the bidirectional buffer 70 connected to the CS wire (the signal wire connected to the output terminal of the output buffer 66), the signal change monitoring part 63 monitors the state of the signal CS flowing in the CS wire. Upon detecting that the signal sig_i has changed from the High (1) state to the Low (0) state (that is, the signal CS has changed from the High (1) state to the Low (0) state) for example, the signal change monitoring part 63 notifies the illegal access judging part 64 of the detection. The state of the signal CS indicates the signal state of the interface part 84.

Based on the monitoring result by the memory access monitoring part 62 and the monitoring result by the signal change monitoring part 63, the illegal access judging part 64 judges the presence/absence of an illegal access to the memory 90. As mentioned above, by the notification from the memory access monitoring part 62 and the notification from the signal change monitoring part 63, the illegal access judging part 64 can obtain those monitoring results.

When notified by the signal change monitoring part 63 that the signal sig_i has entered the Low (0) state, the illegal access judging part 64 judges the signal state of the signal cs_o reported from the memory access monitoring part 62, and if the signal cs_o is in the High (1) state (that is, when the memory 90 is not accessed by the memory control part 61), judges that there has been an illegal access to the memory 90. Also, upon judging that there has been an illegal access, the illegal access judging part 64 notifies the signal control part 65 that there has been an illegal access.

Not being limited to this example, when the memory 90 is not accessed from the memory control part 61, and if there is a change in the signal state of the interface part 84, the illegal access judging part 64 can judge that there is an illegal access. Also, including such a case as this, when there is a difference between the access state from the memory control part 61 to the memory 90 and the signal state of the interface part 84, the illegal access judging part 64 can judge that there is an illegal access.

When notified by the illegal access judging part 64 that there has been an illegal access, the signal control part 65 brings the bidirectional buffer 70 into the output state by setting the signal sig_o output to the input terminal of the bidirectional buffer 70 to the Low (0) state and also setting the output enable signal sig_oe_n to the bidirectional buffer 70 to the Low (0) state. Thereby, upon the occurrence of an illegal access, the signal control part 65 can forcibly set the signal CS to the same state as the state of the signal sig_o, that is the Low (0) state. Not being limited to this example, when an illegal access has been detected by the illegal access detection part 71, the signal control part 65 can set the signal state of the interface part 84 to the write-inhibited state.

Here, the bidirectional buffer 70 is explained. The bidirectional buffer 70 is a buffer that is connected to, other than the signal change monitoring part 63, the signal control part 65 and the CS wire, and is used by being switched between the input state and the output state according to the state of the output enable signal sig_oe_n output from the signal control part 65. For example, the bidirectional buffer 70 can be brought into the input state when the signal sig_oe_n is in the High (1) state and into the output state when the signal sig_oe_n is in the Low (0) state. In the input state, the bidirectional buffer 70 inputs the signal CS flowing in the CS wire and outputs it as the signal sig_i to the signal change monitoring part 63. Also, in the output state, the bidirectional buffer 70 outputs the signal sig_o output from the signal control part 65 to the CS wire to set the signal CS to the same state as the state of the signal sig_o.

However, as shown in FIG. 10, the memory device 6 of Embodiment 2 can have a resistor 81 between the controller 60 and the interface part 84. This resistor 81 is installed for making the potential of the signal CS output from the output terminal of the output-side buffer of the bidirectional buffer 70 upon detecting an illegal access than the potential of the signal CS output from the output terminal of the output buffer 66 to the memory 90. Thereby, upon an illegal access, the signal output from the output terminal of the bidirectional buffer 70 can be securely transmitted to the memory 90.

Note that the resistor 81 also functions as a damping resistor. Therefore, the resistor 81 should preferably be connected to the immediate vicinity of the output terminal of the output buffer 66. A damping resistor can also be installed between the memory 90 and the other buffers 67, 68, 69, and 70.

Also, although in the memory device 6, the signal CS was adopted as both the target signal for monitoring an illegal access and the target signal whose signal level is fixed upon detecting an illegal access, in Embodiment 2 also, either one or both of them can be replaced with the signal of another signal wire as explained in Embodiment 1 and Modifications 2 and 3. Note that as shown in FIG. 10, if only one memory 90 is connected to the controller 60, because the signal CS can be fixed, the CS wire can be omitted from the interface part 84, in which case the signal of the other signal wire can be adopted as the target signal for monitoring an illegal access and the target signal whose signal level is fixed upon detecting an illegal access.

Also, in Embodiment 2 also, as explained in Modification 4 of Embodiment 1, instead of the bidirectional buffer 70, an output buffer (either one of the output buffer 66, 67, or 68) connected to the signal wire of the target signal for monitoring an illegal access and the signal wire of the target signal whose signal level is fixed upon detecting an illegal access can be made a bidirectional buffer.

As explained above, according to Embodiment 2, the signals of the interface part 84 can be controlled according to the detection result of an illegal access in the same manner as in Embodiment 1. That is, in Embodiment 2, the effect of Embodiment 1 can be obtained in the case where a communication regulation based on the SPI standard is applied.

Also, in Embodiment 2, although a communication regulation based on the SPI standard was explained as an example of different communication regulation from the communication regulation based on the I$^2$C standard applied to Embodiment 1, another synchronous serial communication regulation can be adopted, and also an asynchronous serial communication regulation or a parallel communication regulation can be adopted. In addition, even in the case of the communication regulation based on the I$^2$C standard applied to Embodiment 1, a signal wire of the same select signal as the signal CS, in which case the select signal can be adopted as either one or both of the target signal for monitoring an illegal access and the target signal whose signal level is fixed upon detecting an illegal access as explained here.

Note that if an asynchronous communication regulation is adopted, although the presence/absence of an access to memory cannot be detected with a clock signal because there is no clock signal for synchronization, it is possible to receive a signal indicating an access situation directly from the memory control part 11 as in Modification 5 in Embodiment 1 and detect the presence/absence of an access to the memory based on that signal, or detect the presence/absence of an access to the memory based on another control signal such as a data signal. Also, if an asynchronous communication regulation is adopted, because there is no clock signal for synchronization, an illegal writing to memory can be prevented by fixing the level of a data signal or another control signal for example.

<<3>> Embodiment 3

Figure 11:
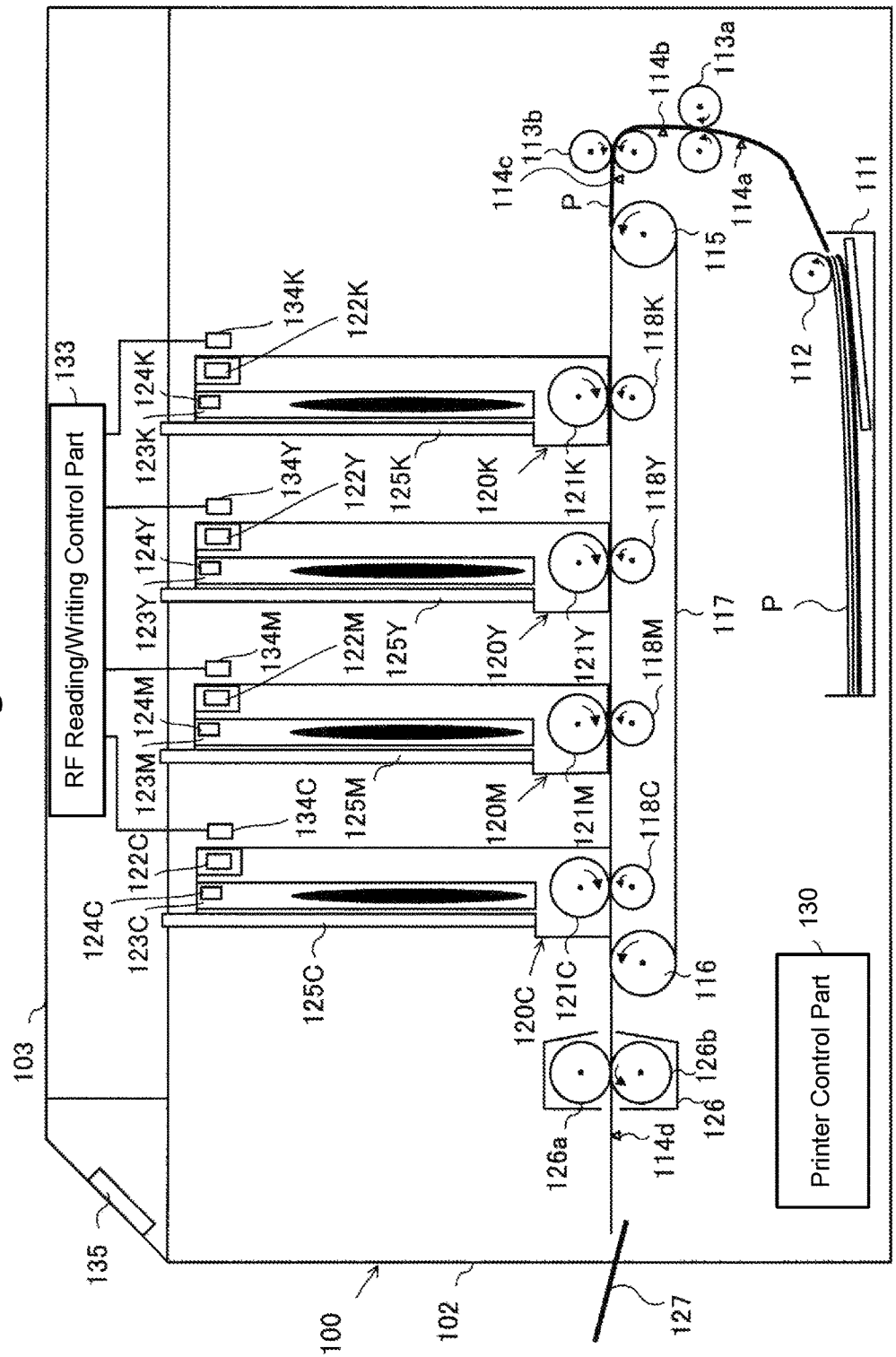
FIG. 11 is a side cross-sectional view showing schematically a configuration example of a printer as an image forming apparatus of Embodiment 3.

As Embodiment 3, an image forming apparatus as an example of the electronic apparatus having the memory device explained in Embodiments 1 and 2 is explained referring to FIGS. 14-16 together. FIG. 11 is a side cross-sectional view showing schematically a configuration example of a printer as the image forming apparatus of Embodiment 3.

Although a printer 100 shown in FIG. 11 is cited as an example of the image forming apparatus of Embodiment 3 below, the printer configuration is not limited to this. Also, the image forming apparatus of Embodiment 3 only needs to be an apparatus that has the memory device mentioned above and performs an image forming process according to information stored in memory in the memory device, and not being limited to a single-function printer such as the printer 100, can be any of various kinds of image forming apparatuses such as a multifunction printer (MFP) and a facsimile machine.

As shown in FIG. 11, the printer 100 has a chassis 102 that contains the printer main body, and an openable top cover part 103 is installed on the upper part of this chassis 102. Detachably attached to the lower part inside the chassis 102 is a recording medium storage part 111 that stores a recording medium P such as print sheet. Installed on the recording medium ejection side of the recording medium storage part 111 is a sheet feeding roller 112 for extracting the recording medium P by one piece at a time from the recording medium storage part 111. Arranged in the carrying route downstream side of the sheet feeding roller 112 are a first registration roller 113a and a second registration roller 113b for carrying the extracted recording medium P toward an image forming part.

Arranged in the upstream side before the first registration roller 113a is a running system sensor 114a for detecting the arrival of the recording medium P. Arranged in the downstream side of the first registration roller 113a is a running system sensor 114b for detecting the arrival of the recording medium P. Further, arranged in the downstream side of the second registration roller 113b is a running system sensor 114c for detecting the timing for the recording medium P to reach the image forming part.

Arranged in the downstream side of the running system sensor 114c is the image forming part. The image forming part forms an image on the recording medium P in electro-photographic processes by charging, exposure, development, transfer, and fusing, and can have carrying rollers 115 and 116, a carrying belt 117 driven by the carrying rollers 115 and 116, multiple transfer rollers, multiple image forming units, multiple light-emitting diode (LED) heads as multiple exposure parts, and a fuser part 126.

As shown in FIG. 11, the image forming part of the printer 100 has image forming parts for individual colors of black (K), yellow (Y), magenta (M), and cyan (C). Note that the carrying rollers 115 and 116, the carrying belt 117, and the fuser part 126 are common components for the image forming parts for the individual colors. The black image forming part has a black transfer roller 118K, a black image forming unit 120K, and a black LED head 125K. The yellow image forming part has a yellow transfer roller 118Y, a yellow image forming unit 120Y, and a yellow LED head 125Y. The magenta image forming part has a magenta transfer roller 118M, a magenta image forming unit 120M, and a magenta LED head 125M. The cyan image forming part has a cyan transfer roller 118C, a cyan image forming unit 120C, and a cyan LED head 125C. Note that although the configuration example shown in FIG. 11 has the image forming parts for the individual colors of black, yellow, magenta, and cyan in this manner, the configuration of the printer is not limited to this.

The carrying belt 117 is an endless belt that is rotationally driven by being stretched between the pair of carrying rollers 115 and 116, and carries the recording medium P sent in toward the downstream side of the image forming part. The four transfer rollers 118K, 118Y, 118M, and 118C mentioned above are disposed with predetermined intervals in the inner side of this carrying belt 117.

The black image forming unit 120K that is a consumable item is detachably attached independently of the chassis 102. The black image forming unit 120K is disposed on the upper side of the carrying belt 117 in a position facing the black transfer roller 118K across this carrying belt 117. In the same manner, the image forming units 120Y, 120M, and 120C for the individual colors of yellow, magenta, and cyan are detachably attached independently of the chassis 102 in positions respectively facing the individual color transfer rollers 118Y, 118M, and 118C across the carrying belt 117.

Installed inside the black image forming unit 120K are a photosensitive drum 121K as an image carrier, a first memory tag 122K as a first memory part, and a toner cartridge 123K that contains black toner as a developer. The toner cartridge 123K has a second memory tag 124K.

The photosensitive drum 121K is disposed in a position facing the black transfer roller 118K across the carrying belt 117. The photosensitive drum 121K is a drum that can form an electrostatic latent image according to black print data on its surface by having the surface charged by an unshown charger and afterwards exposed to light by the LED head 125K according to image data (black image data). A toner image formed on the surface of the photosensitive drum 121K is transferred by the black transfer roller 118K onto the recording medium P carried in.

The first memory tag 122K has nonvolatile memory, and consumable item information (for example, number of printed pages information as the usage amount information, lifetime number of pages information as the lifetime information, and type information as the intended use information of the black image forming unit 120K) is stored in this nonvolatile memory. The toner cartridge 123K has a structure so as to be detachably attached to the black image forming unit 120K and supplies toner contained inside into the black image forming unit 120K. The second memory tag 124K has nonvolatile memory, and consumable item information (for example, toner remaining amount information) is stored in this nonvolatile memory.

The LED head 125K irradiates the surface of the photosensitive drum 121K with light according to the print data, and is attached to the openable top cover part 103. When the top cover part 103 is opened, the LED head 125K separates from the surface of the photosensitive drum 121K, and when the top cover part 103 is closed, it approaches the surface of the photosensitive drum 121K and makes the surface exposable.

Although the black image forming unit 120K was mainly explained, the other color image forming units 120Y, 120M, and 120C also have basically the same configuration. The yellow image forming unit 120Y has a photosensitive drum 121Y, a first memory tag 122Y, and a toner cartridge 123Y having a second memory tag 124Y. The surface of the photosensitive drum 121Y is irradiated with light according to yellow print data by the LED head 125Y. An yellow toner image formed on the surface of the photosensitive drum 121Y is transferred onto the recording medium P by the yellow transfer roller 118Y. Also, the magenta image forming unit 120M has a photosensitive drum 121M, a first memory tag 122M, and a toner cartridge 123M having a second memory tag 124M. The surface of the photosensitive drum 121M is irradiated with light according to magenta print data by the LED head 125M. A magenta toner image formed on the surface of the photosensitive drum 121M is transferred onto the recording medium P by the magenta transfer roller 118M. Also, the cyan image forming unit 120C has a photosensitive drum 121C, a first memory tag 122C, and a toner cartridge 123C having a second memory tag 124C. The surface of the photosensitive drum 121C is irradiated with light according to cyan print data by the LED head 125C. A cyan toner image formed on the surface of the photosensitive drum 121C is transferred onto the recording medium P by the cyan transfer roller 118C.

The fuser part 126 is disposed in the downstream side of the carrying roller 116, fuses the toner images transferred onto the recording medium P with heat and a pressure, and can be configured, for example, of a heat application roller 126a, a pressure application roller 126b in press-contact with the heat application roller 126a through the recording medium P, etc. Disposed in the downstream side of the fuser part 126 is a running system sensor 114d. The running system sensor 114d is a sensor for detecting that the recording medium P is ejected from the fuser part 126. Installed in the downstream side of this running system sensor 114d is an ejection stacker part 127 for stacking the ejected recording medium P.

The sheet feeding roller 112, the first and second registration rollers 113a and 113b, the photosensitive drums 121K, 121Y, 121M, and 121C, the transfer rollers 118K, 118Y, 118M, and 118C, and the fuser part 126 are configured so as to be driven by unshown motors and carry the recording medium P in the printer downstream direction.

Also, the printer 100 has a printer control part 130 having a lifetime management function, a radio-frequency (RF) reading/writing control part 133, antenna parts for the individual colors (an antenna part 134K for black, an antenna part 134Y for yellow, an antenna part 134M for magenta, and an antenna part 134C for cyan), and an operation panel 135.

Connected to the printer control part 130 through unshown cables are the running system sensors 114a-114d, the LED heads 125K, 125Y, 125M, and 125C, the RF reading/writing control part 133, the operation panel 135, etc. The antenna parts 134K, 134Y, 134M, and 134C are arranged in the vicinity of the image forming units 120K, 120Y, 120M, and 120C, respectively, and are connected to the RF reading/writing control part 133 through unshown cables.

The RF reading/writing control part 133 is controlled by the printer control part 130, is provided with control signals and a power source through unshown cables, and has a function to perform communication controls such as the interface (I/F) with the printer control part 130, data reading/writing with the first memory tags 122K, 122Y, 122M, and 122C, and the second memory tags 124K, 124Y, 124M, and 124C. The RF reading/writing control part 133 is connected to the antenna parts 134K, 134Y, 134M, and 134C.

The first memory tag 122K and the second memory tag 124K have a configuration where they are disposed opposing the antenna part 134K to allow wireless communication with the RF reading/writing control part 133 through the antenna part 134K. The RF reading/writing control part 133 has such a configuration as to allow multiple reading from the first memory tag 122K and the second memory tag 124K through the antenna part 134K. The same is true of the first memory tags 122Y, 122M, and 122C, and the second memory tags 124Y, 124M, and 124C.

The operation panel 135 is a part that is arranged outside the chassis 102 and accepts user's operations, and can have a display panel such as an LCD (Liquid Crystal Display) panel and various kinds of operation keys. This display panel is a panel to display guidance images and various kinds of information when the user operates the printer 100. This display panel should preferably be a touch panel capable of detecting touch operations to the regions corresponding to the displayed guidance images. The operation keys are keys for inputting instructions from the user. An instruction input by the user's operation from the operation panel 135 is handed over to the printer control part 130, and the printer control part 130 controls other parts to have them perform operations corresponding to the input instruction. In this manner, the operation panel 135 has a configuration that allows informing the user of messages and inputting setting changes by switch operations by the user.

In the printer 100 having such a configuration as this, the recording medium P stored in the recording medium storage part 111 is fed by one piece at a time by the sheet feeding roller 112, and carried by the registration rollers 113a and 113b to the black image forming unit 120K. In the black image forming unit 120K, the surface of the rotating photosensitive drum 121K is charged by an unshown charger, and when this charged part comes under the LED head 125K, the LED head 125K exposes it with light, forming an electrostatic latent image based on image data on the charged part. This electrostatic latent image is developed by an unshown development roller to become a black toner image. This black toner image is transferred onto the recording medium P by the transfer roller 118K under the carrying belt 117.

In the same manner, the recording medium P sequentially passes through the image forming units 120Y, 120M, and 120C, and in its passing process, yellow, magenta, and cyan toner images are sequentially transferred onto the recording medium P and superimposed. Afterwards, the superimposed color toner images are fused with heat and a pressure applied by the fuser part 126, and ejected to the ejection stacker part 127 outside.

In the process mentioned above, based on the detection results of the running system sensors 114a-114d, the printer control part 130 controls motors such as an image forming unit motor to drive the sheet feeding roller 112, the first and second registration rollers 113a and 113b, the photosensitive drums 121K, 121Y, 121M, and 121C, the transfer rollers 118K, 118Y, 118M, and 118C, and the fuser part 126 to move the recording medium P at predetermined timing and have a color image formed on the recording medium P.

Figure 12:
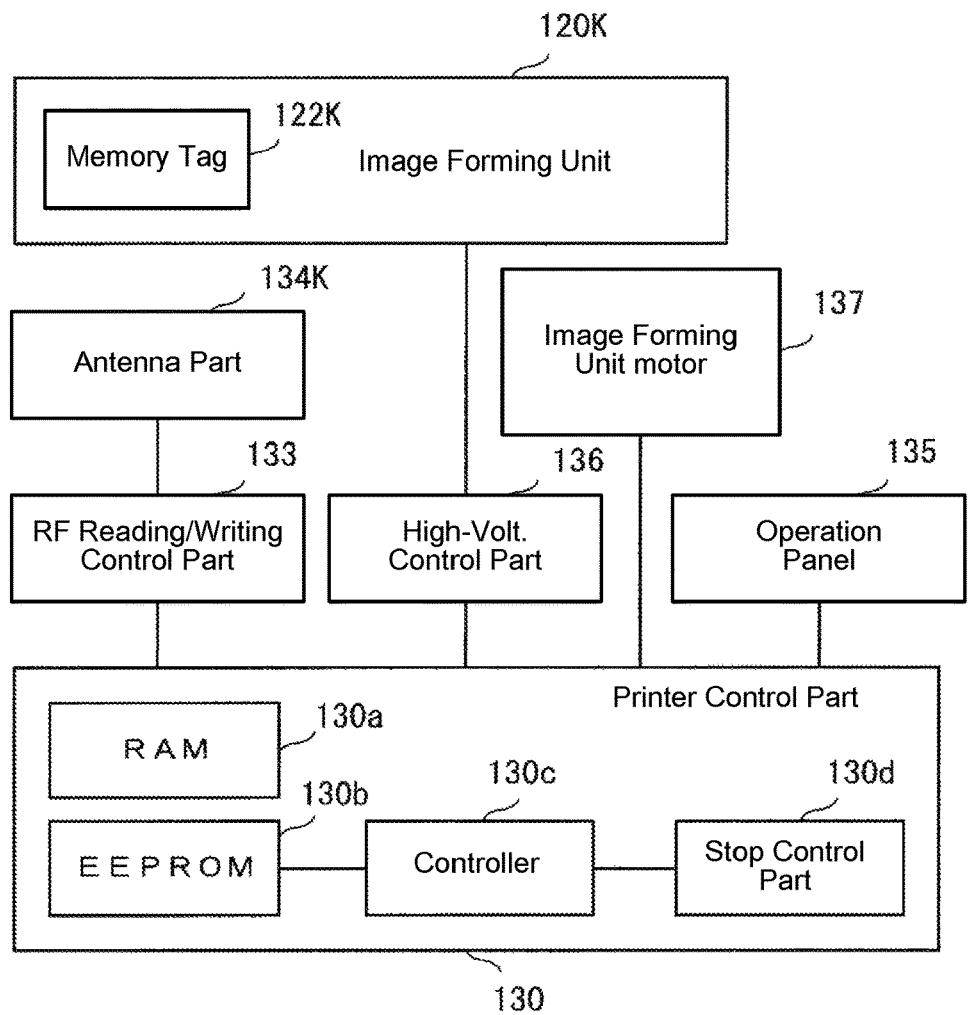
FIG. 12 is a block diagram showing an example of the control mechanism of the printer shown in FIG. 11.

Next, the control mechanism of the printer 100 is explained referring also to FIG. 12. FIG. 12 is a block diagram showing an example of the control mechanism of the printer 100 shown in FIG. 11. As shown in FIG. 12, the control mechanism of the printer 100 can have the image forming unit 120K, the RF reading/writing control part 133, the antenna 134K, the operation panel 135, a high-voltage control part 136, the image forming unit motor 137, and the printer control part 130. Note that although only the components for black are shown in FIG. 12 as to the image forming unit and the antenna part, the control mechanism of the printer 100 also has components for the other colors. The high-voltage control part 136 is connected to the image forming units 120K, 120Y, 120M, and 120C.

The printer control part 130 has a function to control the operations of the printer 100 and execute various kinds of processes such as the image forming process according to a program for controlling the whole printer 100. The printer control part 130 is configured of, for example, an unshown CPU (Central Processing Unit), RAM (Random Access Memory) 130a as volatile memory for temporary storage that is readable and writable at any time, EEPROM 130b that is an example of nonvolatile memory as the second memory part, a controller 130c that controls the EEPROM 130b, an unshown input/output port, etc. Here, the EEPROM 130b is an example of nonvolatile memory corresponding to the memory 30 and 90 explained in Embodiments 1 and 2. Also, the controller 130c is a controller corresponding to the controllers 10, 10a, 10c, 40, and 60 explained in Embodiments 1 and 2. Further, the printer control part 130 can also have a stop control part 130d mentioned below.

Connected to the printer control part 130 through the unshown input/output port are the RF writing/reading controller 133, the operation panel 135, the high-voltage control part 136, and the image forming unit motor 137. Although not shown, the printer control part 130 is connected to and controls the fuser part 126, the running system sensors 114a-114d, the sheet feeding roller 112, the registration rollers 113a and 113b, a motor that drives a sheet feeding and carrying mechanism including the carrying belt 117, a motor that drives the fuser part 126, etc.

In the first memory tags 122K, 122Y, 122M, and 122C as the first memory part, as the consumable item information, for example, the number of printed pages information A as the usage amount information indicating the amount used in each of the image forming units 120K, 120Y, 120M, and 120C, the lifetime number of pages information B as the lifetime information, and the type information C as the intended purpose information are stored with addresses attached.

The printer control part 130 has a function to calculate the usage amount as the number of printed pages information A for each of the image forming units 120K, 120Y, 120M, and 120C. The number of printed pages information A is a value that the usage amount of the image forming unit 120K, 120Y, 120M, or 120C corresponding to black, yellow, magenta, or cyan color is converted to the number of pages printed on A4-size sheets according to the driven time and the drive speed of the image forming unit motor 137. This usage amount can be the number of rotations of the image forming unit 120K, 120Y, 120M, or 120C such as the number of rotations of the photosensitive drum 121K, 121Y, 121M, or 121C. During printing, the number of rotations information indicating the number of rotations is updated in the RAM 130a inside the printer control part 130 and successively stored in the EEPROM 130b by the control of the controller 130c. Also, based on this number of rotations information, the printer control part 130 controls a high-voltage bias value output by the high-voltage control part 136 so as to correct the change with time. Thereby, a stable image quality is guaranteed from the initial period to the end of its lifetime.

The printer control part 130 has a stop control part 130d, that if the number of printed pages information A exceeds the number of pages defined by the lifetime number of pages information for each color, judges that the image forming unit of that color has reached the end of its lifetime and stops the image forming process (print process). Specifically, at the end of lifetime of the image forming unit, the stop control part 130d performs a control to stop each component connected to the printer control part 130. In stopping the image forming process due to the expiration of the lifetime of the image forming unit, the printer control part 130 should better prompt the user to replace it through the operation panel 135 or an unshown interface.

In the EEPROM 130b as the second memory part, as the consumable item information, for example, the number of printed pages information a and the lifetime number of pages b that are use results for each of the loaded image forming units 120K, 120Y, 120M, and 120C are stored with addresses attached.

Also, the printer control part 130 obtains the intended use information stored in the first memory tags 122K, 122Y, 122M, and 122C as the first memory part through the RF reading/writing control part 133, and also obtains the usage amount information stored in the EEPROM 130b as the second memory part through the controller 130c. Then, based on the intended use information and the usage amount information obtained, the printer control part 130 rewrites the lifetime information stored in the first memory tags 122K, 122Y, 122M, and 122C. The printer control part 130 performs this rewriting through the RF reading/writing control part 133, and the timing of the rewriting can be set to the end of a print job for example.

Also, when an illegal access to the EEPROM 130b has been detected, the controller 130c notifies the stop control part 130d of the detection. Then, upon receiving this notification, the stop control part 130d stops the image forming process. The stop control part 130d can stop the image forming process by performing a control to stop each component connected to the printer control part 130 as mentioned above. Although stopping the image forming process can be performed only to the job that is in the middle of forming an image, it is desired to keep the stop state for jobs received afterward.

Also, such an illegal access notification as mentioned above can be performed in the following manner. As explained in Embodiments 1 and 2, the controller 130c brings memory (EEPROM 130b here) into the write-inhibited state upon an illegal access, and the stop control part 130d can monitor the control in that occasion. To explain as an example the case where the controller 130c is the controller 10 shown in FIG. 1, a circuit that monitors the output enable signal sig_oe_n output by the signal control part 15, and when it has entered the Low (0) state, notifies the stop control part 130d of it, can be incorporated in the controller 10 (130c).

Also, a configuration that does not perform such an illegal access notification can be adopted. The fact that the controller 130c brings memory (EEPROM 130b here) into the write-inhibited state upon an illegal access can be utilized. Specifically, for the write command or the read command of various kinds of information (such as the consumable item information mentioned above) to the controller 130c, if an error is received or there is no response from the controller 130c, the stop control part 130d can judge that an illegal access has occurred and stop the image forming process. For example, if it is impossible to update the number of rotations information (count up the number of rotations) in the EEPROM 130b during an image formation, the stop control part 130d can stop the image forming process.

Note that although the stop control part 130d stops the image forming process at the end of lifetime of the image forming unit and also stops the image forming process upon detecting an illegal access, it can be configured so as to stop the image forming process only at either one of them. Note that if the image forming process is stopped also upon detecting an illegal access, the stop control part 130d can also be installed inside the controller 130c.

As explained above, in the image forming apparatus of Embodiment 3, in addition to the effects by Embodiments 1 and 2, the image forming apparatus can be made unavailable for an illegal use. Also, the printer control part 130 of the printer 100 can also perform such a control that when an illegal access has been detected, a predetermined notification destination is notified through a network. Thereby, in the printer 100, an effect of suppressing a repeated illegal use of the printer 100 can be obtained.

Also, although explained as Embodiment 3 was a case where the electronic apparatus was an image forming apparatus, the same processes can be applied to another electronic apparatus than the image forming apparatus. In that case, a process to stop the process executed by that electronic apparatus instead of the image forming process upon detecting an illegal access can be performed.

<<4>> Other Modifications

Figure 13:
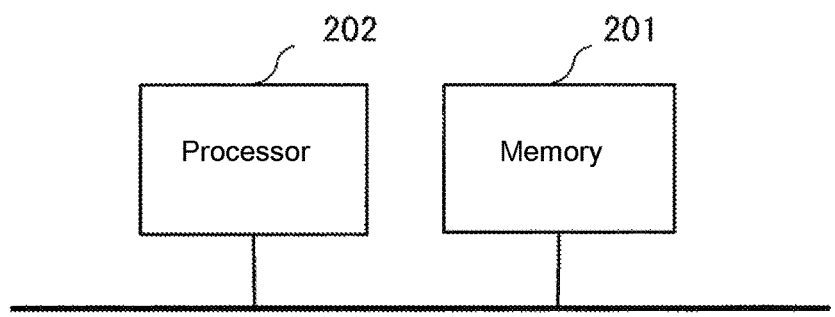
FIG. 13 is a hardware configuration diagram showing part of the configuration of another modification of memory control devices of Embodiments 1 and 2, and part of the configuration of a modification of a printer control part in the image forming apparatus of Embodiment 3.

FIG. 13 is a hardware configuration diagram showing part of the configuration of another modification of the memory control devices of Embodiments 1 and 2. Any of the memory control devices (controllers) controllers 10, 10a, 10c, 40, and 60 shown in FIGS. 1 and 10-13 can be realized (by a computer for example) using memory 201 as the memory device that stores a program (memory control device side program) and a processor 202 as an information processing part that executes the program stored in the memory 201. In this case, all or part of the memory control part, the illegal access detection part, and the signal control part in the controllers 10, 10a, 10c, 40, and 60 can be realized by the processor 202.

Also, FIG. 13 is also a hardware configuration diagram showing part of the configuration of a modification of the printer control part in the image forming apparatus of Embodiment 3. The printer control part 130 shown in FIG. 12 can also control the operations of the printer following a program as mentioned above. That is, the printer control part 130 can also be realized (by a computer for example) using the memory 201 as the memory device that stores a program (printer side program) and the processor 202 as the information processing part that executes the program stored in the memory 201.

Also, any of these memory control device side program and printer side program can be circulated by storing and distributing it in a non-temporary recording medium, or stored in a server device and circulated through the Internet.

Also, as explained above, in the memory control device and the memory device of Embodiments 1 and 2, a memory control method explained below is applied. This memory control method has a memory control step, an illegal access detection step, and a signal control step mentioned below. Also, it can be regarded that the above-mentioned memory control device side program has a computer execute a memory control method having these steps.

In the memory control step, the memory control part of the memory control device controls the memory through an interface part having multiple signal wires according to a predetermined communication regulation. In the illegal access detection step, an illegal access to the memory is detected according to the access state from the memory control part (that is, the access state from the memory control device) to the memory, and the signal state of the interface part. In the signal control step, if an illegal access is detected in the illegal access detection step, the signal state of the interface part is set to the write-inhibited state. The illegal access detection step can be executed by the illegal access detection part installed in the memory control device. The signal control step can be executed by the signal control part installed in the memory control device. Other application examples were explained in the explanations on the memory control device and the memory device, and their explanations are omitted.

Also, as explained above, in the image forming apparatus of Embodiment 3, an image forming method including this kind of memory control method is applied. Also, it can be regarded that the printer side program mentioned above has a computer execute this image forming method. This image forming method can have a stop control step to stop the image forming process upon detecting an illegal access for example. Other application examples were explained in the explanation on the image forming device, and their explanations are omitted.

In the present invention, the "access state" may be determined as a signal level of select state of the memory part by chip select signals (cs_o) or variation timing (or change timing) of clock signals (scl_oe_n) wherein data transmission/receiving timing in accordance with a clock variation synchronization may be used. The state turns to a non-access state when a certain level regardless of Hi or Low continues In the following state, the control unit and/or the illegal access detection part determines that the access is abnormal or the illegal access is made. That state is where signals that are changeable to the "access state" on the upstream side (scl_oe_n, cs_o) maintains a predetermined level at which no access has been made for a predetermined period, the "signal states" of signals showing the "access state" on the downstream side (SCL, CS) vary (or change) and an input of an abnormal signal variation to the memory part connected to the signal line is detected.

What is claimed is:

1. A memory device, comprising:
   a memory;
   an interface part configured by a memory control signal wire;
   a memory control device configured on a chip, and connected to the memory through the memory control signal wire of the interface part; and
   a pull-up resistor connected to the memory control signal wire, and that pull up the memory control signal wire, wherein
   the memory control device comprises
      a memory control part that controls the memory through the interface part in accordance with a predetermined communication regulation;
      a first buffer that has an open-drain output, and configured to connect to the memory control part through a first signal wire and configured to connect to the memory through the memory control signal wire of the interface part;
      an illegal access detection part configured to connect a second signal wire connected to the memory control signal wire, and that detects an illegal access to the memory according to an access state from the memory control part to the memory and a signal state of the interface part, the illegal access detection part being connected to the memory control part through the first signal wire; and
      a signal control part that switches the signal state of the interface part from a write-allowed state, in which the interface part is able to be written, to a write-inhibited state, in which the interface part is protected from being rewritten, when the illegal access is detected by the illegal access detection part.

2. The memory device according to claim 1, wherein the illegal access detection part further comprises:
   a memory access monitoring part that monitors the access state from the memory control part,
   a signal change monitoring part that monitors changes in the signal state of the interface part, and
   an illegal access judging part that judges a presence/absence of the illegal access based on a monitoring result by the memory access monitoring part and another monitoring result by the signal change monitoring part, and
   when no access is made from the memory control part to the memory and a change is found in the signal state of the interface part, the illegal access judging part judges that the illegal access is present.

3. The memory device according to claim 1, wherein the interface part includes a clock signal wire to send a clock signal to the memory, and
   the signal control part sets the signal state of the interface part to the write-inhibited state by fixing a signal level of the clock signal wire to a predetermined signal level.

4. The memory device according to claim 1, wherein the interface part includes a data signal wire to send a data signal to the memory, and
   the signal control part sets the signal state of the interface part to the write-inhibited state by fixing a signal level of the data signal wire to a predetermined signal level.

5. The memory device according to claim 1, wherein the interface part includes a select signal wire to send to the memory a select signal that selects the memory as a control target, and
   the signal control part sets the signal state of the interface part to the write-inhibited state by fixing a signal level of the select signal wire to a predetermined signal level.

6. The memory device according to claim 1, wherein the interface part includes a clock signal wire to send a clock signal to the memory, and
   the illegal access detection part detects the illegal access to the memory according to the signal level of the clock signal wire.

7. The memory device according to claim 3, wherein the illegal access detection part detects the illegal access to the memory according to the signal level of the clock signal wire.

8. The memory device according to claim 1, wherein the interface part includes a data signal wire to send a data signal to the memory, and
   the illegal access detection part detects the illegal access to the memory according to the signal level of the data signal wire.

9. The memory device according to claim 4, wherein the illegal access detection part detects the illegal access to the memory according to the signal level of the data signal wire.

10. The memory device according to claim 1, wherein the interface part includes a select signal wire to send to the memory a select signal that selects the memory as a control target, and
    the illegal access detection part detects the illegal access to the memory according to a signal level of the select signal wire.

11. The memory device according to claim 5, wherein the illegal access detection part detects the illegal access to the memory according to the signal level of the select signal wire.

12. The memory device according to claim 1, wherein the communication regulation is I2C standard.

13. The memory device according to claim 1, wherein the communication regulation is SPI standard.

14. The memory device according to claim 1, wherein the illegal access detection part detects the illegal access when a signal state of a signal showing the access state on a downstream side varies and an input of an abnormal signal variation to the memory, which is connected to a signal line, is detected under a condition where the signal, which is changeable to the access state on an upstream side maintains a predetermined level at which no access has been made for a predetermined period.

15. An image forming apparatus, comprising
    the memory device according to claim 1, and
    an image forming part that develops a latent image on a medium through an image forming process, wherein
    the image forming part performs the image forming process according to information stored in the memory in the memory device.

16. The image forming apparatus according to claim 15, further comprising:

a stop control part that stops the image forming process when the illegal access detection part detects the illegal access to the memory.

17. The memory device according to claim 1, wherein the memory control device further comprises:
   a second buffer that inputs a memory control signal from outside of the memory control device,
   the pull-up resistor is disposed between the memory and the memory control device, and
   the second buffer receives the memory control signal that outputs to the outside the memory control device through the first buffer between the memory control device and the pull-up resistor, and sends to the illegal access detection part.

18. The memory device according to claim 1, wherein the first buffer is a bidirectional buffer, and
   the bidirectional buffer sends a memory control signal that outputs to the outside of the memory control device to the illegal access detection part before outputting to the outside of the memory control device.

19. The memory device according to claim 1, wherein the memory control device further comprises:
   a multiplexer disposed on the upstream side of the first buffer, and that selects a first signal outputting from the memory control part and a set fixed level, and
   when the illegal access is detected, the first buffer is inputted the set fixed level.

* * * * *